(12) United States Patent
Roffet et al.

(10) Patent No.: US 12,096,146 B2
(45) Date of Patent: *Sep. 17, 2024

(54) IMAGE SENSORS WITH DIFFERENT CHARGE-TO-VOLTAGE CONVERSION FACTORS AND METHODS THEREOF

(71) Applicant: STMicroelectronics (Grenoble 2) SAS, Grenoble (FR)

(72) Inventors: Gregory Roffet, Coublevie (FR); Pascal Mellot, Lans en Vercors (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,665

(22) Filed: Jul. 17, 2023

(65) Prior Publication Data

US 2023/0362511 A1  Nov. 9, 2023

Related U.S. Application Data

(63) Continuation of application No. 17/456,846, filed on Nov. 29, 2021, now Pat. No. 11,750,948.

(30) Foreign Application Priority Data

Nov. 30, 2020   (FR) ........................................ 2012379

(51) Int. Cl.
*H04N 25/71* (2023.01)
*H04N 25/46* (2023.01)
*H04N 25/583* (2023.01)

(52) U.S. Cl.
CPC .......... *H04N 25/745* (2023.01); *H04N 25/46* (2023.01); *H04N 25/583* (2023.01)

(58) Field of Classification Search
CPC .... H04N 25/745; H04N 25/46; H04N 25/583; H04N 25/58
See application file for complete search history.

(56) References Cited

U.S. PATENT DOCUMENTS 11,750,948 B2 * 9/2023 Roffet ................. H04N 25/745
348/307
2018/0308881 A1  10/2018 Hynecek
2022/0159208 A1   5/2022 Machida

FOREIGN PATENT DOCUMENTS

| DE | 102011081405 A1 | 2/2013 |
| FR | 2985856 A1 | 7/2013 |
| FR | 3096542 A1 | 11/2020 |
| WO | 2014119159 A1 | 8/2014 |

* cited by examiner

*Primary Examiner* — Twyler L Haskins
*Assistant Examiner* — Angel L Garces-Rivera
(74) *Attorney, Agent, or Firm* — Slater Matsil, LLP

(57) ABSTRACT

The image sensor includes an array of photosensitive pixels comprising at least two sets of at least one pixel, control circuit configured to generate at least two different timing signals and adapted to control an acquisition of an incident optical signal by the pixels of the array, and distribution circuit configured to respectively distribute the at least two different timing signals in the at least two sets of at least one sensor, during the same acquisition of the incident optical signal.

20 Claims, 14 Drawing Sheets

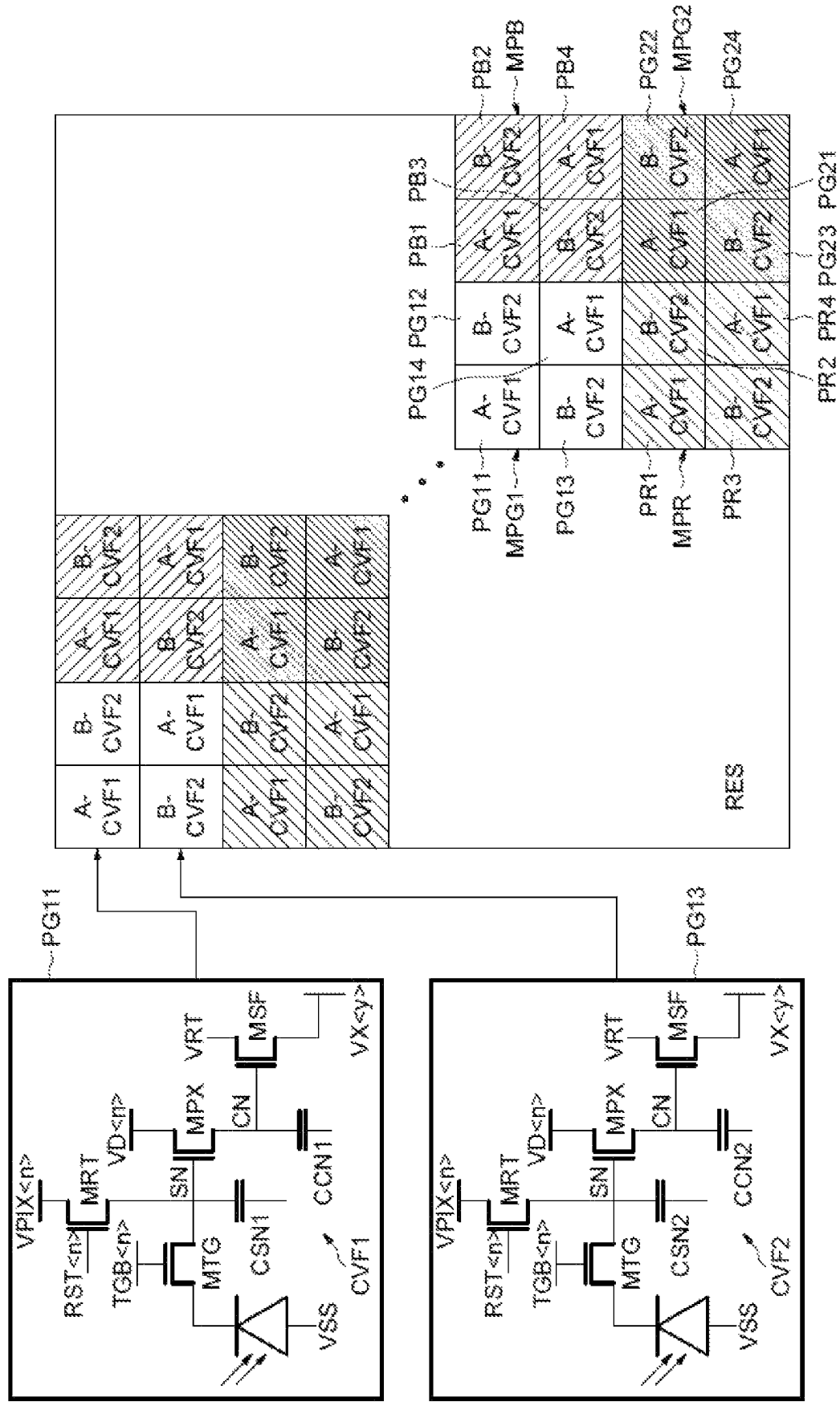

IMAGE SENSORS WITH DIFFERENT CHARGE-TO-VOLTAGE CONVERSION FACTORS AND METHODS THEREOF

CROSS-REFERENCE TO RELATED APPLICATIONS

Thus application is a continuation of U.S. application Ser. No. 17/456,846, filed on Nov. 29, 2021, which claims priority to French Application No. 2012379, filed on Nov. 30, 2020, which applications are hereby incorporated by reference herein in their entirety.

TECHNICAL FIELD

The present invention relates generally to sensors, and, in particular embodiments, to image sensors.

BACKGROUND

Image sensors combining the visible and the infrared, usually called RGB-IR (for the red, green, and blue components of the visible "Red Green Blue" and an infrared component "IR"), include a photosensitive pixel per detected component.

A "pixel" is defined as one single photosensitive site dedicated to only one of the detected components. Each pixel is sensitive over the entire detected spectrum of light and is consequently provided with a filter of the color of the respective component.

An "image element" is defined as a group of photosensitive pixels of several components, such as a group formed by a Bayer pattern of four pixels comprising one red pixel, two green pixels, and a blue pixel.

In the case of RGB-IR image sensors, a four-pixel image element typically comprises one red pixel, one green pixel, one blue pixel, and one infrared pixel.

The pixels of the image sensors are arranged in an array comprising up to several millions of pixels or image elements. By construction, all of the pixels belonging to the same array are usually structurally the same (notwithstanding the respective filters of each pixel). In general, the resolution of the photosensitive sensors is expressed in the number of image elements (commercially called "pixels," in contrast with the present definitions).

Conventionally, in particular, in the case of global shutter acquisitions, all the pixels of the array are controlled simultaneously during the acquisition of an image.

The controls during acquisition may conventionally comprise a phase of resetting the pixels, an integration phase whose duration is called "time of exposure" or possibly "exposure," and a phase of reading the charges photogenerated during the integration.

Yet, the photosensitive pixels typically have a Quantum Efficiency "QE" in the infrared quite lower than their quantum efficiency in the visible.

Consequently, during an acquisition adapted for the efficiency of the pixels in the visible, it is likely that the signals photogenerated by the infrared are of poor quality, i.e., inaccurate and noisy; or conversely, during an acquisition adapted for the efficiency of the pixels in the infrared, it is likely that the signals photogenerated by the visible spectrum are saturated.

Consequently, there is a need to improve the quality of the signals photogenerated by image sensors, including several groups of pixels with different constraints, such as RGB-IR type sensors.

SUMMARY

Embodiments and implementations relate to image sensors, in particular image sensors comprising several sets of pixels, such as image sensors combining the visible and the infrared.

According to one aspect, an image sensor includes an array of photosensitive pixels comprising at least two sets of at least one pixel, a control circuit configured to generate at least two different timing signals and adapted to control an acquisition of an incident optical signal by the pixels of the array, and distribution circuit configured to respectively distribute the at least two different timing signals in the at least two sets of at least one sensor, during the same acquisition of the incident optical signal.

Thus, it is possible to control each set of pixels in compliance with their respective behaviors or possibly according to particular conditions of the optical signal in the different sets of pixels (for example, high-luminosity areas and low-luminosity areas).

It should be recalled that a "pixel" is defined by one single photosensitive site dedicated to only one of the detected components and that an "image element" is defined by a group of pixels of several components.

Consequently, one of the sets of pixels may comprise all the red, green and blue pixels of the visible, and another one of the sets of pixels may comprise all the infrared pixels.

That being so, identical pixels having the same destination (for example, the green pixels or white pixels) may belong to different sets controlled by distinct timing signals, for example, according to their positioning in the array. Thus, some regions of the array, including identical pixels, could be controlled separately, or each image element of the array, and possibly each pixel, could form each set and be controlled individually.

The sets may be defined by any segmentation of the array of pixels, for example, spatial segmentations defined according to the position of the pixels in the array and/or functional segmentations defined according to the use for which the pixels are intended.

According to one embodiment, the timing signals are adapted to control the time of exposure of the respective pixels to the incident optical signal.

Indeed, the time of exposure is a parameter that typically allows adjusting an acquisition for almost all possible conditions of the optical signal.

According to one embodiment, the array is arranged in rows and columns of pixels, and the distribution circuit includes a row and/or column decoder configured to selectively access the rows and/or the columns corresponding to the at least two sets of at least one pixel.

In absolute terms, a row decoder allows accessing each row separately, and a column decoder allows accessing each column separately, enabling the distribution of a unique timing signal respectively in each array pixel. That being so, for practical reasons, individually accessing each array pixel is not always necessary. Consequently, in an advantageously simpler and more compact manner, the row and/or column decoders may be configured to specifically access the sets of pixels as they are arranged in the array.

According to one embodiment, the array comprises at least one first set of pixels configured to detect components of the visible spectrum of the incident optical signal, the control circuit is configured to respectively generate at least one first timing signal, and the distribution circuit is configured to distribute the at least one first timing signal, respectively in the at least one first set of pixels.

Thus may correspond to the case where one of the at least two sets is the set of pixels of the visible spectrum or to a case in which the pixels of the visible spectrum are divided into several first sets that could thus be timed separately during the same acquisition.

And, for example, the array comprises several first sets of pixels; each first set may correspond to a local region of the array.

For example, this could allow adjusting both the timing of the pixels in a local region receiving a very low luminosity to avoid underexposure and the timing of the pixels in a local region receiving a very high luminosity to avoid overexposure.

According to one embodiment, the array comprises at least a one-second set of pixels configured to detect an infrared component of the incident optical signal and the control circuit is configured to respectively generate at least a one-second timing signal. The distribution circuit is configured to distribute the at least one-second timing signal, respectively, in the at least one second set of pixels.

Thus, the infrared pixels may be controlled in compliance with their low quantum efficiency to generate signals in useful dynamics, independently of the control of the other pixels, for example, the pixels of the visible spectrum.

According to one embodiment, the array comprises at least one-third set of pixels configured to detect information on the ambient luminosity of the incident optical signal, such as the luminance and/or the color temperature and/or the scintillation. The control circuit is configured to respectively generate at least one-third timing signal, and the distribution circuit is configured to distribute the at least one-third timing signal in respectively the at least one-third set of pixels.

In other words, in this embodiment, it is proposed to use the possibility of controlling some pixels separately from the other ones, offered by the sensor according to this aspect, to incorporate in the array of pixels, for example, of the photographic type, the ambient luminosity measuring pixels, conventionally implemented in a distinct device (typically an Ambient Light Sensor "ALS").

Advantageously, the third set of pixels includes a homogeneous spatially pseudo-random distribution of isolated pixels on the surface of the array.

Thus, only some image elements of the array "sporadically" include a pixel dedicated to measuring the information on the ambient luminosity instead of a pixel normally dedicated to a component of the visible or infrared. Consequently, the information normally provided by the pixels, thus replaced in a discrete and isolated manner, could be easily rebuilt by conventional techniques, such as techniques for extrapolating the information provided by the neighboring pixels.

Besides, the homogeneous distribution in the surface of the array enables the pixels of the third set to gather information on the ambient luminosity in the entirety of the incident optical signal.

In this respect, advantageously, the image sensor further includes a processing circuit dedicated to the third set of pixels and configured to average and filter signals photogenerated by the pixels of the third set during the acquisition to provide information on the overall ambient luminosity of the incident optical signal.

Indeed, since it could not be considered in an array of pixels, in particular a photographic-type one, to introduce an optical diffuser to homogenize the entirety of the incident optical signal, this embodiment advantageously provides for digital processing adapted to provide relevant global information from the local points of measurements of the pixels belonging to the third set.

For example, the pixels of the third set of pixels are configured to detect multispectral components of the spectrum of the incident optical signal.

By "multispectral components," it should be understood, for example, components that are more widely distributed over the spectrum of the incident optical signal than the RGB-IR components, including, in particular, the red, green, blue primary colors, and the infrared but also other components of the spectrum, such as ultraviolet, deeper infrared, and non-visible colors of the visible. For example, the number of multispectral components of the pixels of the third set may be comprised of between 5 and 25 different components.

According to another aspect, a method for capturing an image comprises a generation of at least two different timing signals. It is adapted to control the acquisition of an incident optical signal by pixels of an array of photosensitive pixels comprising at least two sets of at least one pixel, and a distribution of the at least two different timing signals in the at least two sets of at least one pixel, during the same acquisition of the incident optical signal.

According to one implementation, the timing comprises control of the time of exposure of the respective pixels to the incident optical signal.

According to one implementation, the array is arranged in rows and columns of pixels, and the distribution comprises a row and/or column decoding, to selectively access the rows and/or the columns corresponding to the at least two sets of at least one pixel.

According to one implementation, the method comprises an acquisition of components of the visible spectrum of the incident optical signal in at least one first set of pixels, controlled by at least one first timing signal respectively distributed in the at least one first set of pixels.

According to one implementation, the acquisition of the components of the visible spectrum of the incident optical signal is done in several first sets of pixels, each corresponding to a local region of the array.

According to one implementation, the method comprises the acquisition of an infrared component of the incident optical signal in at least a one-second set of pixels, controlled by at least a one-second timing signal respectively distributed in the at least one-second set of pixels.

According to one implementation, the method comprises a measurement of information on the ambient luminosity of the incident optical signal, such as the luminance and/or the color temperature and/or the scintillation, in at least one-third set of pixels, controlled by at least one third timing signal respectively distributed in the at least one-third set of pixels.

According to one implementation, the pixels of the third set of pixels are distributed in a homogeneous spatially pseudo-random manner in isolated pixels on the surface of the array.

According to one implementation, the method further comprises processing, comprising an averaging and filtering of the signals photogenerated by the pixels of the third set during the acquisition to provide information on the overall ambient luminosity of the incident optical signal.

According to one implementation, the measurement of the information on the ambient luminosity of the incident optical signal comprises the acquisition of multispectral components of the spectrum of the incident optical signal.

According to another aspect, it is also provided an image sensor including an array of photosensitive pixels arranged in rows and columns of pixels comprising at least two sets of pixels, each corresponding to a region of the array including several adjacent rows, a control circuit configured to generate as many different timing signals as there are sets of pixels, the timing signals being adapted to control a time of exposure of an acquisition of an incident optical signal by the pixels of the array, and distribution circuit configured to respectively distribute the timing signals in the sets of pixels, during the same acquisition of the incident optical signal.

According to one embodiment, the distribution circuit includes a row decoder configured to selectively access the rows of the regions of the array corresponding to the at least two sets of pixels.

According to one embodiment, the regions of the array are located over a half-length of the adjacent rows on either side of a median of the array perpendicular to the direction of the rows.

According to one embodiment, the distribution circuit includes a first row decoder dedicated to the first half of the array on one side of the median, as well as a second row decoder dedicated to the second half of the array on the other side of the median.

According to one embodiment, the regions of the array are located over the entire length in the direction of the rows of the adjacent rows.

According to one embodiment, the control and distribution circuits are configured to distribute the timing signals during the same acquisition of the incident optical signal so that the times of exposure of the different sets of pixels start at the same time point or the times of exposure of the different sets of pixels finish at the same time point, or the times of exposure of the different sets of pixels are distributed and included within the duration of the longest time of exposure.

According to one embodiment, the sets of pixels comprise a first set of pixels, a third set of pixels, and, between the first set and the third set, a second set of pixels, including at least two subsets of at least one row of pixels, the control circuit is configured to generate first timing signals adapted to control a first time of exposure for the first set of pixels, third timing signals adapted to control a third time of exposure, longer than the first time of exposure, for the third set of pixels. Second timing signals adapted to control second times of exposure with durations varying monotonously between the first time of exposure and the third time of exposure, respectively from the subset of pixels adjacent to the first set up to the subset of pixels adjacent to the third set.

According to another aspect, it is proposed a method for capturing an image comprising a generation of at least two different timing signals and adapted to control a time of exposure of an acquisition of an incident optical signal by pixels of an array of photosensitive pixels (RES), arranged in rows and columns of pixels, comprising as many sets of pixels as there are timing signals, each of the sets of pixels corresponding to a physical region of the array including several adjacent rows, the method comprising a distribution of the timing signals respectively in the sets of pixels, during the same acquisition of the incident optical signal.

According to one implementation, the distribution comprises a row decoding to selectively access the rows of the regions of the array corresponding to the at least two sets of pixels.

According to one implementation, the method is adapted for regions of the array located over a half-length of the adjacent rows, on either side of a median of the array perpendicular to the direction of the rows.

According to one implementation, the distribution comprises a first row decoding dedicated to the first half of the array on one side of the median and a second row decoding dedicated to the second half of the array on the other side of the median.

According to one implementation, the method is adapted for regions of the array located over the entire length in the direction of the rows of the adjacent rows.

According to one implementation, the generation and the distribution are adapted to distribute the timing signals during the same acquisition of the incident optical signal so that the times of exposure of the different sets of pixels starting at the same time point or the times of exposure of the different sets of pixels finishing at the same time point or the times of exposure of the different sets of pixels are distributed and included within the duration of the longest time of exposure.

According to one implementation, the generation of the timing signals comprises a generation of first timing signals adapted to control a first time of exposure for a first set of pixels, a generation of third timing signals adapted to control a third time of exposure, longer than the first time of exposure for a third set of pixels, and a generation of second timing signals adapted to control second times of exposure for a second set of pixels including at least two subsets of at least one row of pixels between the first set and the third set, the second times of exposure having durations varying monotonously between the first time of exposure and the third time of exposure, respectively from the subset of pixels adjacent to the first set up to a subset of pixels adjacent to the third set.

According to another aspect, it is proposed that an image sensor, as defined hereinabove, includes a reading circuit configured to provide read signals resulting from an acquisition of an incident optical signal by the pixels of the array, wherein the control circuit includes a video timing circuit configured to assess the dynamics of the image from distribution of the amplitudes of the read signals and to control a next acquisition of an incident optical signal with the timing signals and distribution of the timing signals in a frame mode if the dynamics are lower than the first threshold, in a band mode if the dynamics are comprised between the first threshold and a second threshold, and in a pixel mode if the dynamics are higher than the second threshold.

According to one embodiment, in the frame mode, the control and distribution circuits are configured to generate timing signals adapted to control a unique time of exposure and distribution of these timing signals to all pixels of the array.

According to one embodiment, in the band mode, the control and distribution circuits are configured to generate as many different timing signals as there are sets of pixels and to distribute these timing signals in the sets of pixels, each corresponding to a region of the array including several adjacent rows.

According to one embodiment, in the pixel mode, the control and distribution circuits are configured to generate the respective timing signals to each set of at least one pixel and distribute these timing signals in the sets of at least one respective pixel.

According to one embodiment, the video timing circuit is configured, in each mode, to set the times of exposure controlled by the timing signals of a subsequent acquisition according to the read signals resulting from a prior acquisition, respectively, in each of the different sets of pixels.

According to another aspect, it is proposed a method for capturing an image as defined hereinabove, comprising: a reading providing read signals resulting from an acquisition of an incident optical signal by the pixels of the array, an analysis of the dynamics of the image from distribution of the amplitudes of the read signals, and control of a next acquisition of an incident optical signal with the timing signals and distribution of the timing signals in a frame mode if the dynamics are lower than a first threshold, in a band mode if the dynamics are comprised between the first threshold and a second threshold, and in a pixel mode if the dynamics are higher than the second threshold.

According to one implementation, in the frame mode, the generation and the distribution of the timing signals are adapted to control a unique time of exposure in all pixels of the array.

According to one implementation, in the band mode, the generation and the distribution of the timing signals are adapted to control respective times of exposure to each of the sets of pixels, each corresponding to a region of the array including several adjacent rows.

According to one implementation, in the pixel mode, the generation and distribution of the timing signals are adapted to control respective times of exposure to each of the sets of pixels each corresponding to a region of the array including several adjacent rows.

According to one implementation, in each mode, the times of exposure controlled by the timing signals of a subsequent acquisition are set according to the read signals resulting from a prior acquisition, respectively, in each of the different sets of pixels.

According to another aspect, it is also proposed an image sensor includes an array of photosensitive pixels dedicated to components of the spectrum of light, each pixel including a photosensitive semiconductor region, a transfer gate coupled between the photosensitive region and a transfer node, the transfer node having a capacitive value defining a charge-to-voltage conversion factor of each pixel, wherein the array of pixels is arranged according to a periodic pattern of macro-pixels each dedicated to one component, and each including at least one first pixel and at least one second pixel dedicated to this component, the capacitive value of the transfer node of the first pixel defining a first charge-to-voltage conversion factor, the capacitive value of the transfer node of the second pixel defining a second charge-to-voltage conversion factor different from the first charge-to-voltage conversion factor.

According to one embodiment, the periodic pattern of macro-pixels includes at least two macro-pixels dedicated to respective components, the first pixels and second pixels of the at least two macro-pixels being positioned to be contiguous only to the first or second pixels of another macro-pixel of the same pattern.

According to one embodiment, each macro-pixel includes two first pixels and two second pixels, and wherein the periodic pattern of macro-pixels includes four macro-pixels dedicated, respectively, to four components.

According to one embodiment, the sensor includes a control circuit configured to generate a first timing signal and a second timing signal, different and adapted to respectively control a first time of exposure and a second time of exposure of an acquisition of an incident optical signal by the pixels of the array and distribution circuit configured to distribute the first timing signal in the first pixels of the macro-pixels of the array and to distribute the second timing signal in the second pixels of the macro-pixels of the array, during the same acquisition of the incident optical signal.

According to one embodiment, the first charge-to-voltage conversion factor is greater than the second charge-to-voltage conversion factor and the first time of exposure is longer than the second time of exposure.

According to another aspect, it is proposed a method for capturing an image with an image sensor as defined hereinbefore, comprising a generation of a first timing signal and a second timing signal, different and adapted to respectively control a first time of exposure and a second time of exposure of an acquisition of an incident optical signal by the pixels of the array, and distribution of the first timing signal in the first pixels of the macro-pixels of the array, and of the second timing signal in the second pixels of the macro-pixels of the array, during the same acquisition of the incident optical signal.

According to one implementation, the first charge-to-voltage conversion factor is greater than the second charge-to-voltage conversion factor, and the first time of exposure is longer than the second time of exposure.

According to one implementation, the capture method comprises a reading providing first read data resulting from the same acquisition of the incident optical signal by the first pixels of the array and second read data resulting from the same acquisition of the incident optical signal by the second pixels of the array, a reconstruction of a high dynamic range "HDR" image, comprising an application of a respective normalization gain to each read data, the respective normalization gains being adapted to compensate for the difference between the respective times of exposure of the pixels of the array.

According to one implementation, the reconstruction of the HDR image further comprises, before the application of the normalization gain: an identification, for each read data, of an exposure limit condition amongst an overexposure condition, an underexposure condition, or a near-limit condition; and if the read data is identified in one of the exposure limit conditions, a determination of a substitution data, replacing the read data, from the read data resulting from acquisition with neighboring pixels of the array dedicated to the same component.

According to one implementation, the overexposure condition is identified if the read data results from an acquisition with the first time of exposure. If the read data has a value greater than a second threshold, the corresponding substitution data being determined from the read data resulting from an acquisition with the second time of exposure of the neighboring pixels of the array.

According to one implementation, the underexposure condition is identified if the read data results from an acquisition with the second time of exposure. If the read data has a value lower than a first threshold, the corresponding substitution data being determined from the read data resulting from an acquisition with the first time of exposure of the neighboring pixels of the array.

According to one implementation, the near-limit condition is identified if the read data has a value comprised between the first threshold and the second threshold. The corresponding substitution data is determined from the read data resulting from an acquisition with the first time of exposure of the neighboring pixels of the array and from the read data resulting from an acquisition with the second time of exposure of the neighboring pixels of the array.

According to one implementation, the determination of the substitution data comprises calculating a weighted average value of the read data resulting from acquisition with neighboring pixels of the array, the weights being assigned to the read data according to an orientation of the spatial variations in the HDR image.

BRIEF DESCRIPTION OF THE DRAWINGS

Other advantages and features of the invention will appear upon examining the detailed description of non-limiting embodiments and implementations, and from the appended drawings, wherein:

FIG. 9A illustrates an embodiment of the pixels of the array in collaboration with the implementations of image captures described before in connection with FIGS. 1 to 8;

DETAILED DESCRIPTION OF ILLUSTRATIVE EMBODIMENTS

Figure 1:
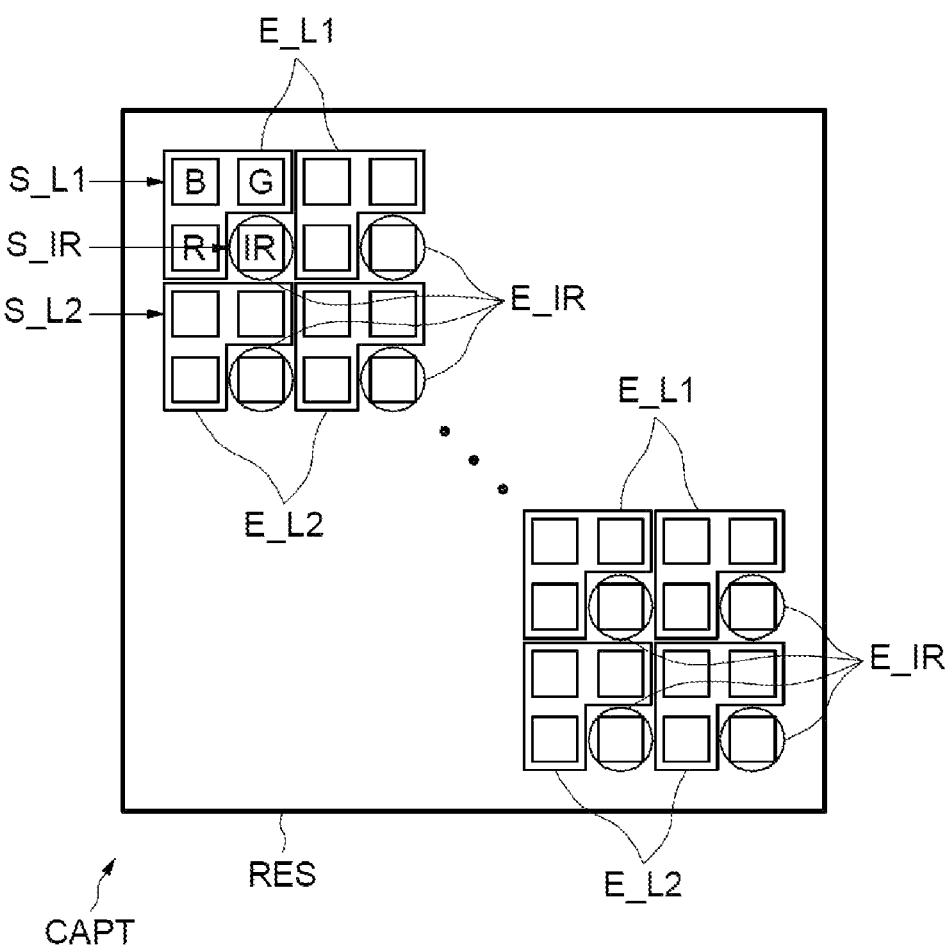
FIG. 1 illustrates an example of an array of photosensitive pixels RES of an RGB-IR type image sensor.

FIG. 1 illustrates an example of an array of photosensitive pixels RES of an RGB-IR type image sensor CAPT, i.e., a photographic-type sensor capable of capturing the image of an incident optical signal in the visible spectrum and the infrared spectrum.

In particular, the term "image" of an optical signal corresponds to the convergence of the incident optical signal in a focal plane of an optical system, such as a photographic objective, the surface of the array RES being aligned in the focal plane.

In this respect, the array of pixels RES includes R, G, and B dedicated to the components of primary colors of the visible, red, green, and blue, and pixels dedicated to the infrared IR. For brevity, the pixels will be referred to by the colors to which they are dedicated.

It should be recalled that a "pixel" is defined as a single photosensitive site dedicated to only one amongst the components of the spectrum by means of a filter of the respective color and that an "image element" is defined as a group of photosensitive pixels of several components allowing, for example, recomposing the entire spectrum detected at a given point of the optical image of the incident optical signal.

In the typical case of RGB-IR image sensors, a four-pixel image element typically comprises one red R pixel, one green V pixel, one blue B pixel, and one infrared IR pixel in a 2*2 pixel square.

That being so, the array of photosensitive pixels RES is shared in different sets of pixels E_L1, E_L2, and E_IR, which do not necessarily correspond to the construction of the image elements.

The segmentation of the sets of pixels E_L1, E_L2, E_IR is performed to control the different sets of pixels with distinct timing signals S_L1, S_L2, S_IR, for example, selected according to the position of each set in the array of pixels, and/or according to the use to which the pixels are intended.

The timing signals S_L1, S_L2, SIR are generated and distributed with a control circuit (CMD) and distribution circuit (DIST), specifically as described hereinafter in connection with FIG. 3.

In particular, the timing signals S_L1, S_L2, and S_IR are adapted to control the time of exposure of the respective pixels during the same acquisition of the incident optical signal.

In the example of FIG. 1, the segmentation is defined by the function of the pixels, and the array RES comprises two first sets E_L1, E_L2 of pixels of the visible R, G, B and a second set E_IR comprising the infrared IR pixels.

The segmentation is also defined spatially between the first sets E_L1 and E_L2 of visible pixels, each corresponding to rows of blocks of three red R, green G, and blue B pixels (horizontally in the orientation of FIG. 1). The rows of either of the first sets of pixels of the visible E_L1 and E_L2 are successively alternated in the array RES.

Figure 2:
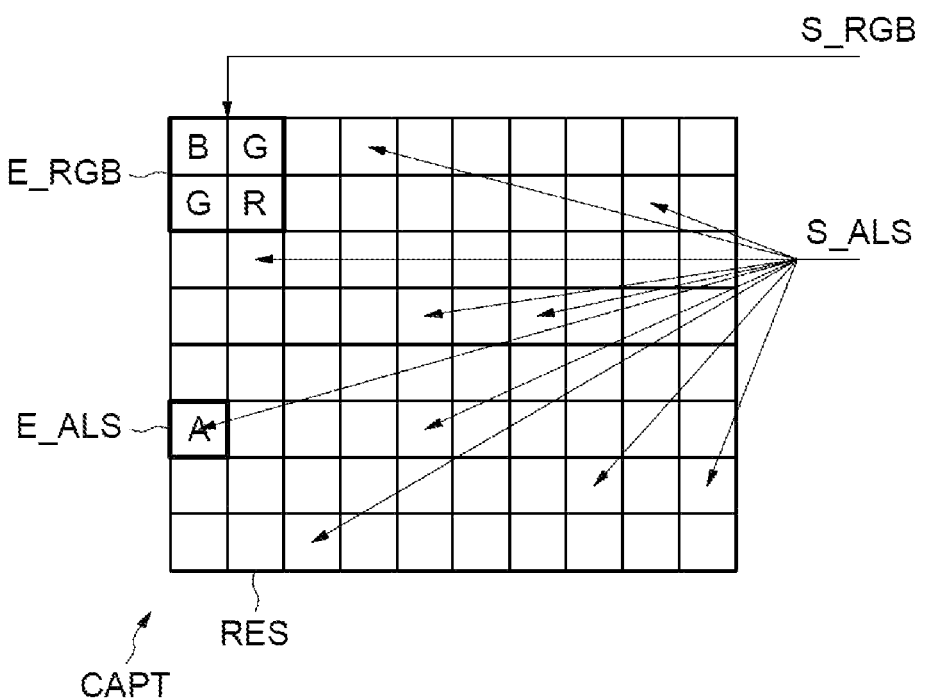
FIG. 2 illustrates another example of an array of photosensitive pixels RES of an RGB-type image sensor.

FIG. 2 illustrates another example of an array of photosensitive pixels RES of an RGB-type image sensor CAPT, further comprising an ambient luminosity measuring device integrated into the array RES. The example of FIG. 2 is not incompatible with RGB-IR type arrays, for example, as described in connection with FIG. 1.

The array RES comprises a first set of pixels E_RGB, including all the pixels of the visible spectrum, conventionally arranged into image elements according to the Bayer pattern, i.e., in squares of four pixels each including one red R pixel, two green V pixels, and one blue pixel B.

The array RES further includes a third set of pixels E_ALS intended to measure information on the ambient luminosity of the incident optical signal (usually referred to as "Ambient Light Sensing").

The adjective "third" qualifying the set of pixels intended to measure the ambient luminosity E_ALS is given in continuation with the first set and second set, introduced before in connection with FIG. 1. The numbering order of the first, second, and third sets E_L1, E_L2, E_IR, and E_ALS described in connection with FIGS. 1 and 2 is purely arbitrary and is intended only to nominally distinguish the different sets of pixels.

The measurement of the information on the ambient luminosity may comprise a measurement of the luminous intensity of the incident signal, a measurement of the chromatic temperature of the incident signal, or a characterization of scintillation of a source of the incident signal. For example, the scintillation may correspond to the periods of illumination-extinction of the LED (acronym of "Light Emitting Diode," perfectly known to a person skilled in the art) emitters.

Consequently, the measurement of the information on the ambient luminosity does not need spatial resolution, i.e., it does not need to know the image of the incident optical signal and typically comprises a number of photosensitive pixels much smaller than the number of pixels of a photographic-type image sensor.

Indeed, the pixels of the third set of pixels E_ALS are, for example, configured to detect multispectral components of the spectrum of the incident optical signal, i.e. components distributed in the spectrum of the incident optical signal, such as in particular the red, green, blue primary colors, and the infrared but also other components of the spectrum, such as ultraviolet, deeper infrared, and non-primary colors of the visible. For example, the number of multispectral components of the pixels of the third set may comprise between 5 and 25 different components and possibly up to 32 different components.

The third set E_ALS may include a few hundred pixels of each component, for example, for a total comprised between 10,000 (ten thousand) and 50,000 (fifty thousand) pixels, which forms a number much smaller than the number of pixels of the visible of the array RES, for example in the range of several million.

Consequently, the pixels A of the third set E_ALS are disposed of in an isolated manner and according to a pseudo-random and spatially homogeneous distribution in the array RES.

That being so, the density of pixels of the array RES not allowing introducing pixels in addition to the pixels of the visible R, G, and B, each pixel of the third set E_ALS takes the place of one pixel of the first set E_RGB.

In other words, some image elements of the array include a pixel A dedicated to measuring the information on the ambient luminosity instead of a pixel normally dedicated to a visible component and possibly to the infrared.

Consequently, the information normally provided by the pixels of the visible, thus sporadically replaced, i.e., in a discrete and isolated manner, could be easily rebuilt by conventional techniques, such as techniques for extrapolating the information provided by the neighboring pixels.

In this respect, we will advantageously choose to replace green pixels with the pixels of the third set E_ALS since the green pixels are double in each image element of Bayer's pattern.

Figure 3:
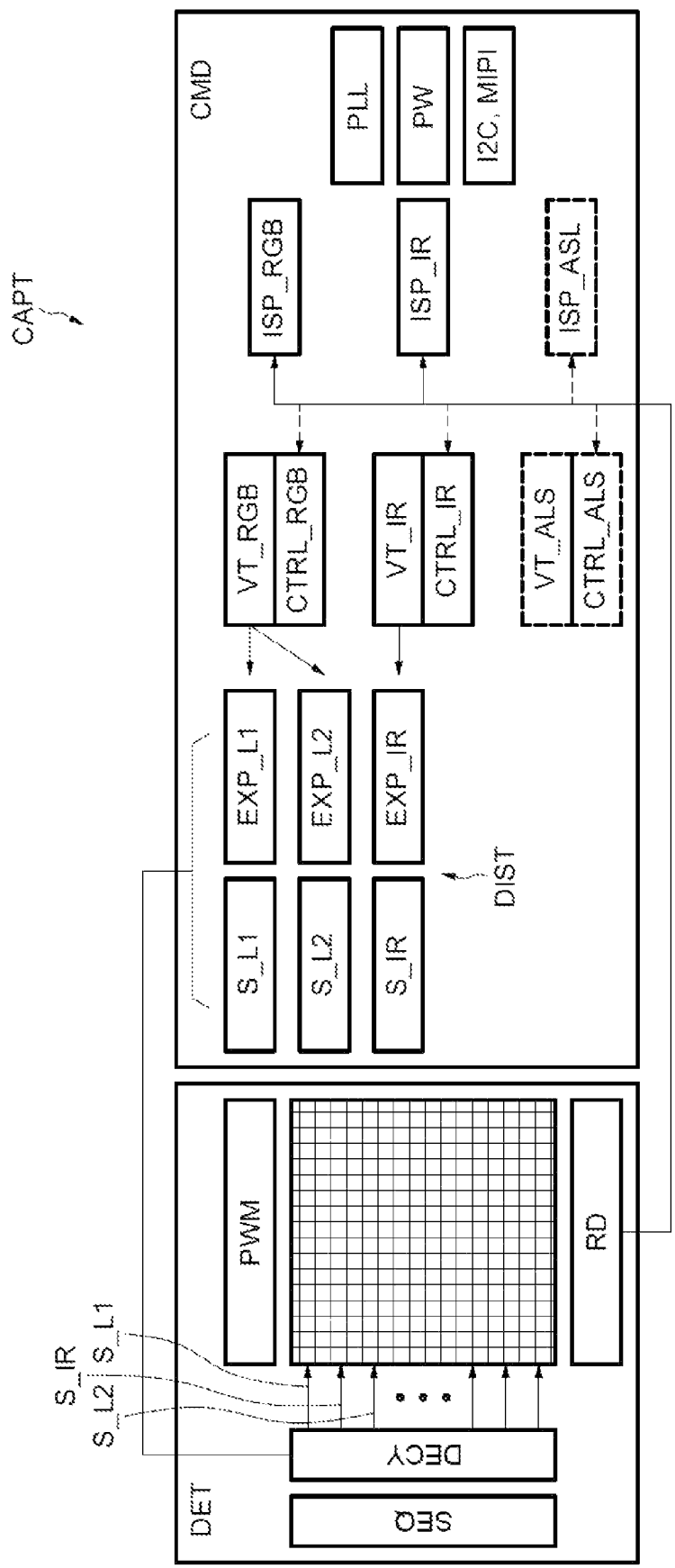
FIG. 3 illustrates an example of an image sensor, including the array of pixels RES described before in connection with FIG. 1, as well as control and distribution circuits.

FIG. 3 illustrates an example of an image sensor CAPT including the array of pixels RES described before in connection with FIG. 1 and control CMD and distribution DIST circuits.

The image sensor CAPT includes a detection circuit DET incorporating the array of pixels RES and a control circuit CMD incorporating the control circuit CMD. It is considered that the distribution circuit DIST is incorporated into both the control circuit CMD and the detection circuit DET. For example, the detection circuit DET and the control circuit CMD are integrated on respective chips.

Besides the array RES, the detection circuit DET includes a power supply circuit PWM configured to provide supply voltages to the array RES, a sequencer SEQ and a row decoder DECY configured to provide sequences of signals controlling the operations of the array of pixels RES in a manner adapted to its architecture; and reading circuit RD configured to read the data resulting from an acquisition of an incident optical signal.

During acquisition of an incident optical signal, the pixels are, for example, controlled according to a sequence comprising a reset emptying parasitic charges present in the photosensitive sites of the pixels, an integration phase with a duration corresponding to the time of exposure, in which a charge amount is photogenerated by excitation of the incident optical signal in the photosensitive sites; a transfer phase upon completion of the integration phase, in which the different amounts of photogenerated charges are transferred towards a storage region of the pixels; and a phase of reading the charge amount stored in each storage region of the pixels of the array RES.

The sequences of signals controlling the operations of the array of pixels RES are derived from timing signals S_L1, S_L2, and SIR originating from the control circuit CMD, usually called "video timing," and allow in particular setting the time of exposure EXP_L1, EXP_L2, EXP_IR.

In this respect, the control circuit CMD includes a video timing circuit VT_RGB dedicated to the visible, that is to say to the first sets of pixels E_L1, E_L2, and a video timing circuit VT_IR dedicated to the infrared, that is to say to the second set of pixels E_IR. The video timing circuits VT_RGB and VT_IR are configured to generate the respective timing signals S_L1, S_L2, and S_IR.

Thus, the video timing circuits VT_RGB and VT_IR of the control circuit CMD are configured to generate several different timing signals S_L1, S_L2, and S_IR, respectively, for each set of pixels E_L1, E_L2, E_IR of the array RES.

The timing signals S_L1, S_L2, S_IR are adapted to control the acquisition of the incident optical signal by the pixels of the array RES, in particular, to control the time of exposure EXP_L1, EXP_L2, EXP_IR of the pixels of each set E_L1, E_L2, E_IR.

The distribution circuit DIST, cooperating with the sequencer SEQ and the decoder DECY, is configured to distribute the different timing signals S_L1, S_L2, and S_IR in the corresponding sets of pixels E_L1, E_L2, E_IR, during the same acquisition of the incident optical signal.

Thus, the pixels belonging to the different sets E_L1, E_L2, and E_IR may have a time of exposure specifically established according to their destinations. In particular, the infrared pixels of the second set E_IR could profit from a time of exposure longer than the red-green-blue pixels of the first sets E_L1, E_L2. For example, this compensates for a charge photogeneration quantum efficiency lower in the infrared than in the visible.

In other words, the RGB-IR image sensor is controlled to operate in an optimum manner in each set of pixels, i.e., in this example, in an optimum manner, in the visible domain via the timing signals S_L1, S_L2 controlling specifically the first sets of pixels E_L1, E_L2, and in the infrared domain via the timing signal S_IR controlling the second set of pixels E_IR.

Furthermore, the video timing circuits VT_L1, VT_L2, VT_IR may include a respective calculation circuit CTRL_RGB, CTRL_IR, for example, configured to automatically adapt the respective times of exposure EXP_L1, EXP_L2, EXP_IR according to signals continuously output from the reading circuit RD.

Moreover, the control circuit CMD includes image signal digital processor circuits ISP_RGB and ISP_IR, dedicated to each set of pixels, whose functions include, in particular, a digital compensation for the distinct times of exposure.

The image signal digital processor circuits ISP_RGB and ISP_IR may also carry out the typical image processing functions, such as spectral reconstructions of the optical signal for each image element, filtering, noise reductions, etc.

Finally, the control circuit CMD includes conventional implementations of a power supply stage PW, of a phase-locked loop PLL type signal generator, and of an external communication interface, for example of the I²C or MIPI type (usual terminologies of technologies well known to a person skilled in the art).

Figure 4:
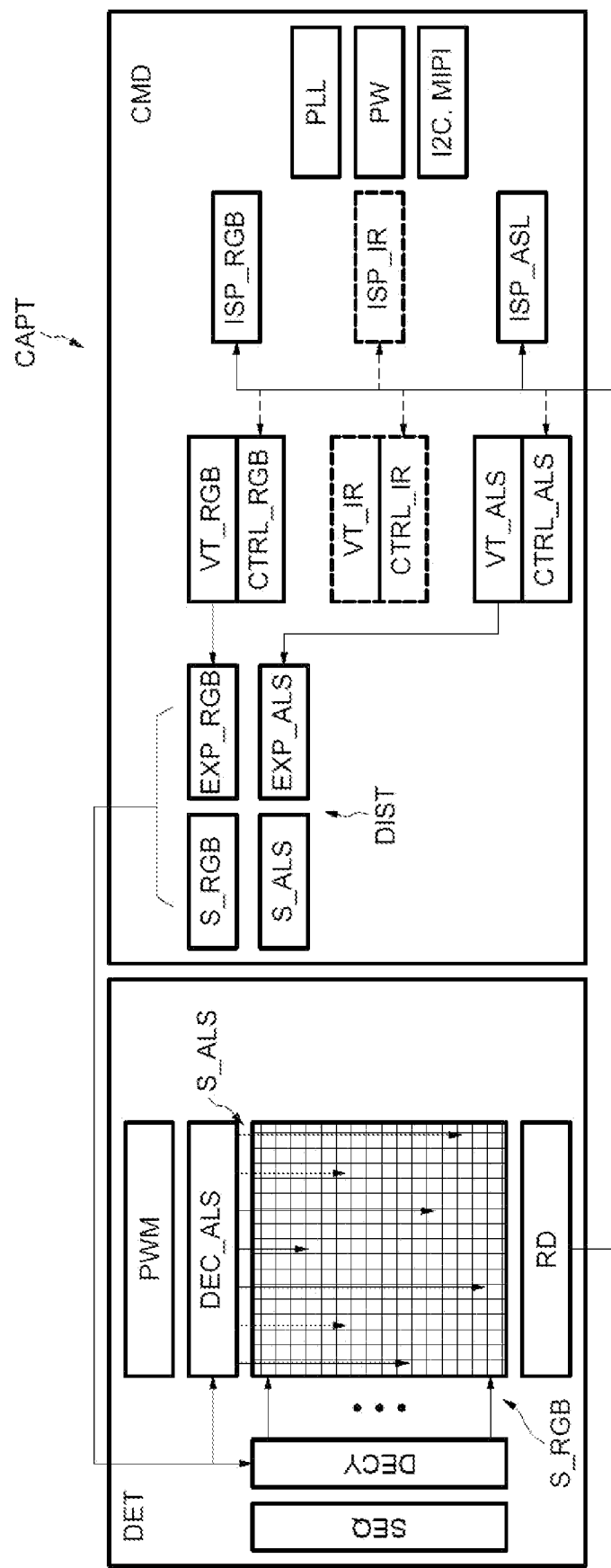
FIG. 4 illustrates another example of an image sensor of the same type as that described in connection with FIG. 3, but this time includes the array of pixels described before in connection with FIG. 2.

FIG. 4 illustrates another example of the image sensor CAPT, of the same type as that described in connection with FIG. 3, but this time including the array of pixels RES described before in connection with FIG. 2.

The elements common with the example of image sensor CAPT described in connection with FIG. 3 bear the same references, and not all will be detailed again.

In this embodiment, the array of pixels RES includes a first set of pixels E_RGB dedicated to the red-green-blue component of the visible spectrum of the incident optical signal and a third set of pixels E_ALS configured to measure information on the ambient luminosity of the incident optical signal.

Consequently, the control circuit CMD includes the video timing circuit VT_RGB for the first set E_RGB of pixels dedicated to the visible and a video timing circuit VT_ALS for the third set E_ALS of the pixels dedicated to the measurement of the ambient luminosity.

The video timing circuits VT_RGB and VT_ALS are configured to generate the respective timing signals S_RGB, S_ALS, and the respective times of exposure EXP_RGB and EXP_ALS.

For example, the video timing circuit VT_ALS may also include a respective calculation circuit CTRL_ALS to automatically adapt the timing signals according to signals continuously output from the reading circuit RD.

Herein again, the distribution circuit DIST cooperates with the sequencer SEQ and the decoder DECY to distribute the different timing signals S_RGB, S_ALS in the corresponding sets of pixels E_RGB, E_ALS, during the same acquisition of the incident optical signal.

Nevertheless, in this embodiment, the detection circuit DET includes a decoder DEC_ALS dedicated to the pixels of the third set E_ALS, i.e., a circuit specifically intended to distribute the timing signals S_ALS in the pixels of the third set E_ALS.

Providing such a dedicated decoder, DEC_ALS allows accessing through a simple decoding of the pixels of the third set E_ALS isolated in the array according to a pseudo-random and spatially homogeneous distribution.

In turn, the row decoder DECY is configured to access all the pixels of the array RES except the pixels of the third set E_ALS.

It should be noted that the management of the pixels of the third set E_ALS is not incompatible with the example of the RGB-IR sensor described in FIG. 3.

The control circuit CMD includes an image signal digital processor circuit ISP_ALS, dedicated to the third set of pixels E_ALS and specifically configured to obtain information on the overall incident signal from local measurement points. In other words, the image signal digital processor circuit ISP_ALS is configured to digitally simulate the effect of an optical diffuser from measurements on the image of an optical signal focused on the plane of the array RES.

Figure 5:
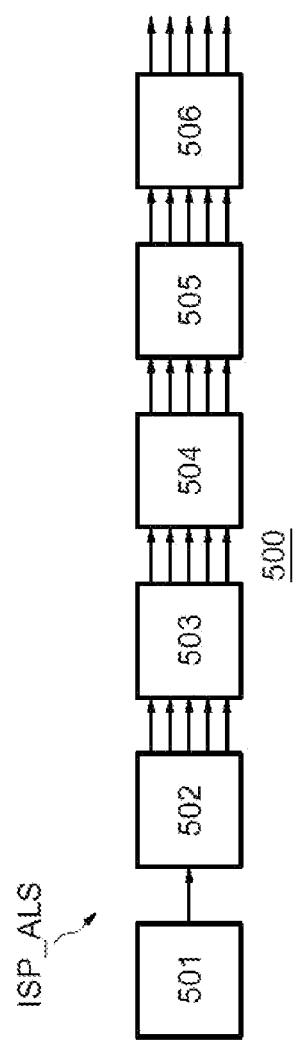
FIG. 5 illustrates an example of an image signal digital processing method that could be implemented by the processor circuit.

In this respect, reference is made to FIG. 5.

FIG. 5 illustrates an example of an image signal digital processing method 500 that could be implemented by the processor circuit ISP_ALS.

Step 501 comprises the reception of the read signals of the pixels of the third set E_ALS provided by the reading circuit RD and a grouping of the different multispectral components, recorded in respective buffer memories at step 502.

Step 503 comprises an averaging and filtering of the groups of measurements of each multispectral component.

Step 504 optionally allows dividing the measured information on the ambient luminosity relative to different regions of the array RES in which different measurements have been performed.

Step 505 optionally allows setting an auto-exposure parameter of the pixels of the third set E_ALS.

Step 506 comprises the application of a normalization gain to the calculated data, according to the time of exposure EXP_ALS controlled during the acquisition, to provide coherent values.

Figure 6A:
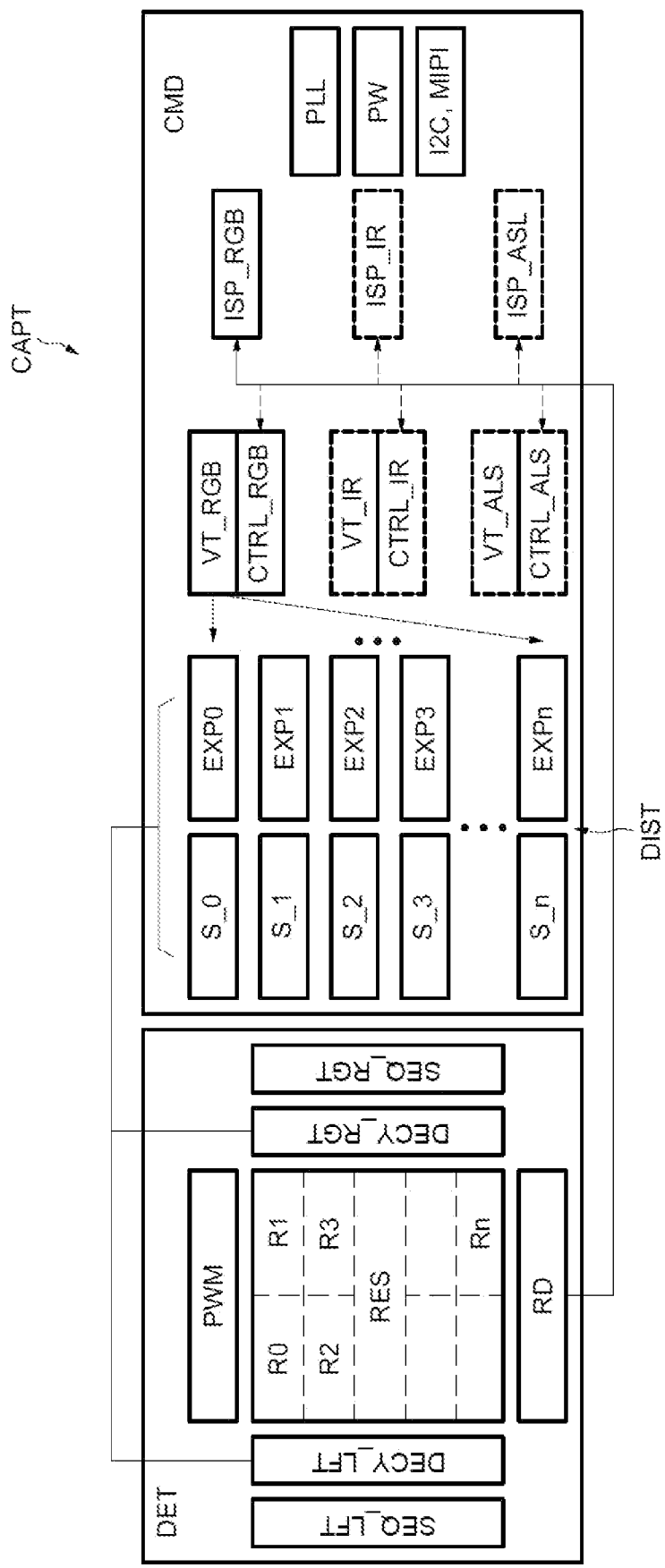
FIG. 6A illustrates another example of an image sensor of the same type as that described in connection with FIGS. 3 and 4, but this time including the array of pixels comprising only pixels dedicated to the visible spectrum of the incident optical signal.

FIG. 6A illustrates another example of the image sensor CAPT, of the same type as that described in connection with FIGS. 3 and 4, but this time including the array of pixels RES comprising only pixels dedicated to the visible spectrum of the incident optical signal.

The elements common with the examples of image sensor CAPT described in connection with FIGS. 3 and 4 bear the same references, and not all will be detailed again.

In this embodiment, the array RES comprises several first sets of pixels, each corresponding to one local region R0, R1, R2, R3, . . . , Rn of the array RES.

The video timing circuit VT_RGB is configured to generate as many timing signals S_0, S_1, S_2, S_3, . . . , S_n as there are regions R0-Rn of the array, respectively distributed in each region by the distribution circuit DIST.

In this example, the regions R0-Rn of the array RES are separated vertically (i.e., in the columns) into two halves, one including the "even" regions R0, R2, . . . and the other one including the "odd" regions R1, R3, . . . , Rn.

In this respect, the detection circuit DET includes a sequencer SEQ_LFT and a row decoder DECY_LFT dedicated to the "even" half of the array RES, and a sequencer SEQ_RGT and a row decoder DECY_RGT dedicated to the "odd" half of the array RES.

Consequently, each region R0-Rn could profit from a specifically established time of exposure, for example, depending on whether the regions R0-Rn are more or less illuminated in comparison with a pre-established use case or automatically by an auto-exposure algorithm per region R0-Rn implemented by the calculation circuit CTRL_RGB, according to the read signals continuously provided by the reading circuit RD.

It should be noted that using the local regions R0-Rn in the above-described array RES is not incompatible with the examples of the image sensor CAPT described in FIGS. 3 and 4.

Figure 6B:
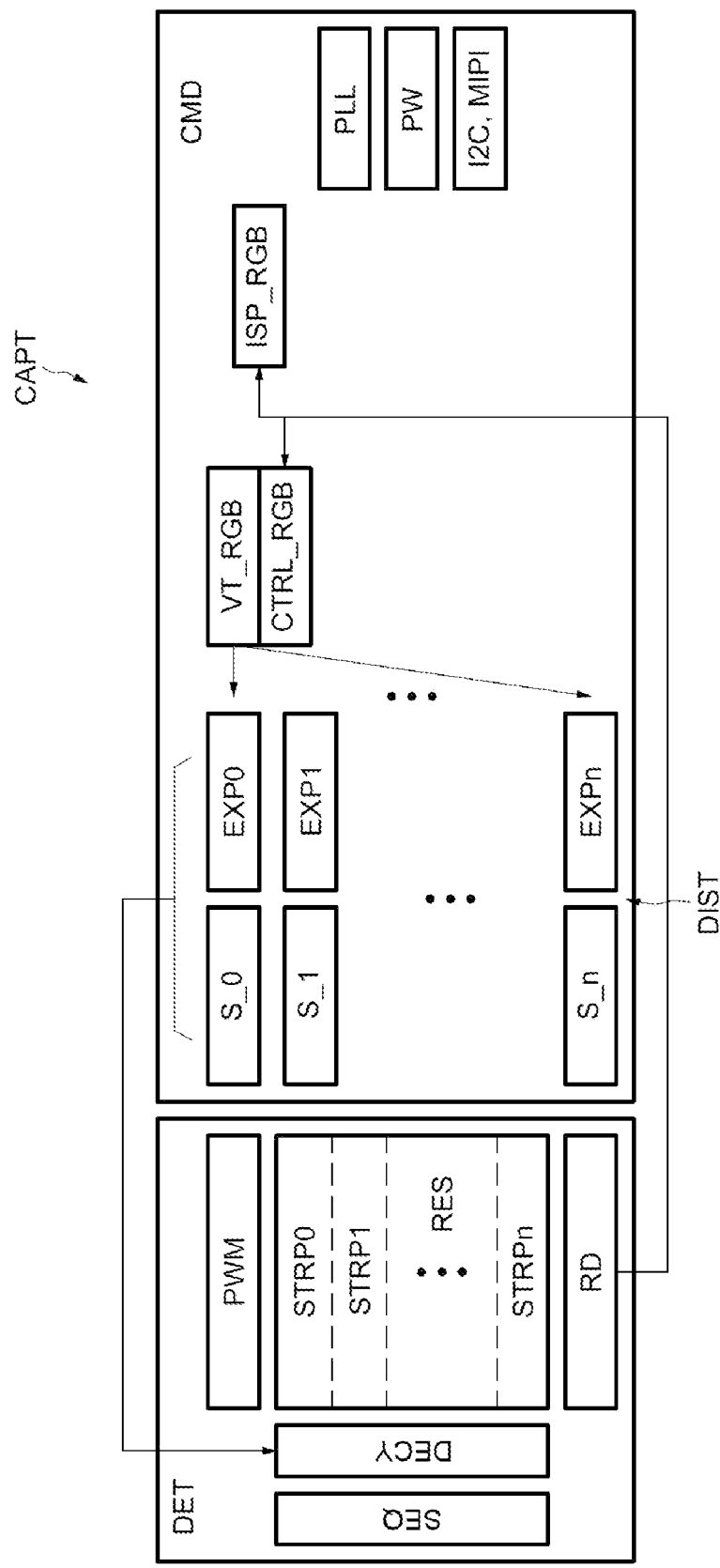
FIG. 6B illustrates another embodiment of the example of the image sensor described before in connection with FIG. 6A.

FIG. 6B illustrates another embodiment of the example of the image sensor CAPT described before in connection with FIG. 6A.

In this other example, each set of pixels of the array RES corresponds to a physical region of the array RES located over several adjacent rows. In this example, the rows in the series are complete, i.e., the different regions STRP0, STRP1, . . . , STRPn of the array are located over the entire length of the adjacent rows (i.e. in the direction of the rows, in which the rows extend), and not over the half-lengths of the rows respectively located on either side of a median of the array perpendicular to the direction of the rows as described in connection with FIG. 6A.

Thus, each set of pixels STRP0-STRPn corresponds to a band of pixels in the array RES. In the image acquired by the array RES, the bands will advantageously have a horizontal orientation. However, a vertical orientation could also be considered depending on the application of the sensor CAPT.

Thus suppresses the lateral distinction between the regions (on either side of the median), but advantageously allows for simplifying the distribution circuit DIST thereby reducing the occupied surface.

Indeed, it could be advantageous to get rid of the cumulated bulk of a first row decoder DECY_LFT and a first sequencer SEQ_LFT dedicated to the first "even" half of the array RES and of a second row decoder DECY_RGT and a second sequencer SEQ_RGT dedicated to the second "odd" half of the array RES, as described in connection with FIG. 6A.

Yet, in this embodiment, in an advantageously compact manner, the distribution circuit includes a row decoder DECY and a sequencer SEQ for the entirety of the regions of the array RES, allowing selective accessing the rows of the regions of the array corresponding to the sets of pixels.

Moreover, in horizontal orientation of the bands of pixels in the image, the trigger signals S_0-S_n could advantageously be generated and distributed by the control circuit CMD (i.e., by the video timing circuit VT_RGB) and the distribution circuit (i.e., the row decoder DECY and the sequencer SEQ) for the times of exposure EXP0-EXPn of each band to follow an increasing and monotonous variation from the top of the image to the bottom of the image. Thus means that the time of exposure EXP0 of the first band STRP0, the highest one in the image, is shorter than the time of exposure EXP1 of the second band STRP1 below and adjacent to the first band STRP1, and so on, up to the longest time of exposure EXPn of the last band STRPn, the lowest one in the image.

Indeed, depending on the application of the image sensor CAPT, it is possible to consider that the conditions of the highest luminosity are typically found in the upper portion of the image (for example, sky, sun). In contrast, the conditions of the lowest luminosity are typically found in the bottom portion of the image (for example, ground or shadow of a forefront object).

In particular, this distribution of the times of exposure EXP0-EXPn is advantageous in capturing images inside a vehicle passenger compartment facing the passengers. Indeed, in this acquisition type, the top portion of the image typically comprises conditions of high luminosity (for example, panoramic windshield, sunroof, hatchback glass), the middle portion of the image typically comprises conditions of mean luminosity (for example, faces and bust of the driver), and in which the bottom portion typically comprises conditions of low luminosity (for example abdomen and legs of the driver in the shadow of the dashboard).

That being so, the timing signals S_0-S_n cannot be configured to adapt the times of exposure according to the use cases, for example, according to the type and equipment of the vehicle, and in a manner that could be configured by a user (for example the manufacturer of the vehicle). The case of a vehicle passenger compartment is provided as a non-limiting example.

In particular, the variation of the times of exposure EXP0-EXPn of each band may be other than a monotonous growth from the top to the bottom of the image, for example, to apply.

Moreover, the image signal digital processing circuit ISP_RGB could apply an exposure compensation gain to the read data. The exposure compensation gains could be easily calculated according to the respective times of exposure of the sets of pixels from which the read signals are derived to compensate for the differences between the times of exposure in the sets.

That being so, the time of exposure of the pixels of one region affects the signal-to-noise ratio of the read data, to which the human eye is very sensitive. Thus, to avoid degradation of the quality of the image perceivable at the boundaries between two adjacent bands STRP/STRP1, . . . , STRPn–1/STRPn, a transition is advantageously implemented.

Figure 6C:
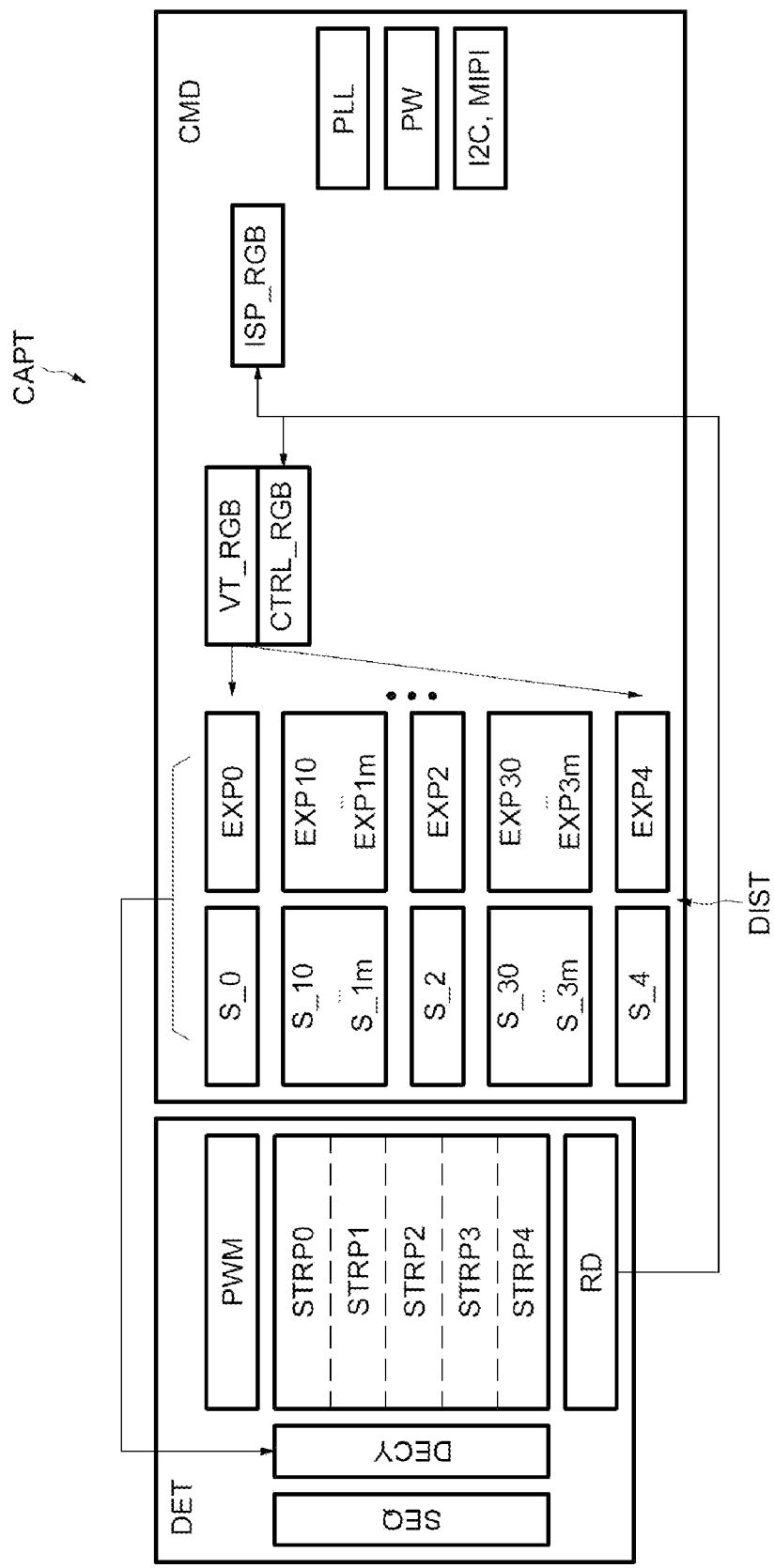
FIG. 6C corresponds to the embodiment described in connection with FIG. 6B, wherein "transfer" bands are provided between bands having given times of exposure.

In this respect, reference is made to FIG. 6C.

FIG. 6C corresponds to the embodiment described in connection with FIG. 6B, wherein "transfer" bands STRP1 are provided between bands STRP0, STRP2 having given times of exposure EXP0, EXP2.

For convenience, FIG. 6C corresponds to an example where the array RES includes five sets of pixels STRP0-STRP4, i.e., the case where n=4 of the example described in connection with FIG. 6B.

It is considered that all the pixels of the first band STRP0 are controlled at the same first time of exposure EXP0, all the pixels of the third band STRP2 are controlled at the same third time of exposure EXP2, and all the pixels of the fifth band STRP4 are controlled at the same fifth time of exposure EXP4.

Thus, to implement the transition mechanism, the pixels of the second band STRP1 (and of the fourth band STRP3), located between the first band STRP0 and the third band STRP2 (resp. between the third band STRP2 and the fifth band STRP4), are divided into subsets of pixels within the second band STRP1 (resp. the fourth band STRP3).

The subsets are analogous to the sets of pixels in that each comprises at least one row of pixels. In that, the control circuit CMD is configured to generate respective timing signals S_10, . . . , S1m, (resp. S_30, . . . , S3m) adapted to control respective times of exposure EXP10, . . . , EXP1m, (resp. EXP30, . . . , EXP3m) for each subset of pixels of the bands STRP1 (resp. STRP3).

And, advantageously, the control circuit is configured to generate the second timing signals S_10 . . . , S1m (resp. S_30, . . . , S3m) controlling second times of exposure EXP10, . . . , EXP1m, (resp. EXP30, . . . , EXP3m) with durations varying monotonously between the first time of exposure EXP0 and the third time of exposure EXP2 (resp. between the third time of exposure EXP2 and the fifth time of exposure EXP4), applied in the subsets, respectively of the first subset of pixels adjacent to the first set STRP0 (resp. adjacent to the third set STRP2) up to the last subset of pixels adjacent to the third set STRP2 (resp. adjacent to the fifth set STRP4).

In other words, the times of exposure of the subsets are gradually controlled from one subset to another subset starting from the fixed time of exposure in the neighboring set up to the fixed time of exposure in the other neighboring set, to uniformize the variations spatially in the array, of the durations of the times of exposure.

Thus, for example, if each of the subsets of the second set STRP1 comprises a row of pixels, the times of exposure EXP10-EXP1m could be incremented by one step P1, such that $P1=(EXP2-EXP0)/(m+1)$, where (m+1) is the number of subsets (number of rows) of the second set STRP1, and $EXP1k=EXP0-P1*(k+1)$. In the corresponding example for the subsets of the fourth set STRP3, step P3 is expressed as $P3=(EXP4-EXP2)/(n+1)$, where (n+1) is the number of subsets (number of rows) of the fourth set STRP3, and $EXP3k=EXP2+P3*(k+1)$.

In the three embodiments described in connection with FIGS. 6A, 6B, and 6C, the control and distribution circuit may further advantageously be configured to distribute the timing signals during the same acquisition of the incident optical signal so that the times of exposure of the different sets of pixels start at the same time point, or the times of exposure of the different sets of pixels finish at the same time point, or the times of exposure of the different sets of pixels are distributed and included within the duration of the longest time of exposure.

In particular, the sequencer(s) SEQ of the distribution circuit DIST may be configured to implement the different possibilities of distributions of the events at the beginning and at the end of exposure of the respective sets.

Advantageously, the case where the times of exposure of the different sets of pixels start at the same time point allows for a simple configuration of the distribution circuit and for a control closer to typical acquisitions.

Advantageously, the case where the times of exposure of the different sets of pixels finish at the same time point allows profiting from coherent information for the readouts of the different bands of pixels STRP0-STRPn. Indeed, this allows, in particular, a "rolling readout" of the pixels of the array without requiring local intermediate storage of the read data.

Advantageously, the case where the times of exposure of the different sets of pixels are distributed and included within the longest time of exposure allows limiting internal "ghost effects." "Ghost effects" are typically caused by a movement of an object of the acquired scenery between two regions whose time points of exposure are different, causing the presence of the same object twice in the image.

In the three embodiments described in connection with FIGS. 6A, 6B, and 6C, the reading circuit RD may further advantageously be configured to provide read signals resulting from an acquisition of an incident optical signal by the pixels of the array, in a "continuous" manner, i.e., for example during successive acquisitions composing a video stream. Then, the control circuit may further advantageously be configured between a prior acquisition and a subsequent acquisition to set the times of exposure controlled by the timing signals of the subsequent acquisition according to the read signals resulting from the prior acquisition.

For example, this could allow having the different regions of the array of pixels with a respective exposure adapted in real-time to the luminosity of the portion of the scenery corresponding to this region.

Indeed, by analyzing each region, the control circuit determines the proper exposure required for this region to guarantee proper read signals, i.e., neither overexposed nor underexposed, and with a good signal-to-noise ratio.

Finally, in the three embodiments described in connection with FIGS. 6A, 6B, and 6C, the image signal digital processor circuit ISP_RGB may advantageously be configured to apply to the read signals a gain adapted to compensate for the different times of exposure, the gains being calculated according to the respective times of exposure of the sets of pixels from which the read signals are derived.

Thus, the image signal digital processor circuit ISP_RGB allows aligning the image information between the different regions STRP0-STRPm in terms of luminance and luminosity.

In this respect, the image signal digital processor circuit ISP_RGB is configured to receive the coordinates of the pixels related to each gain to be applied.

Figure 7:
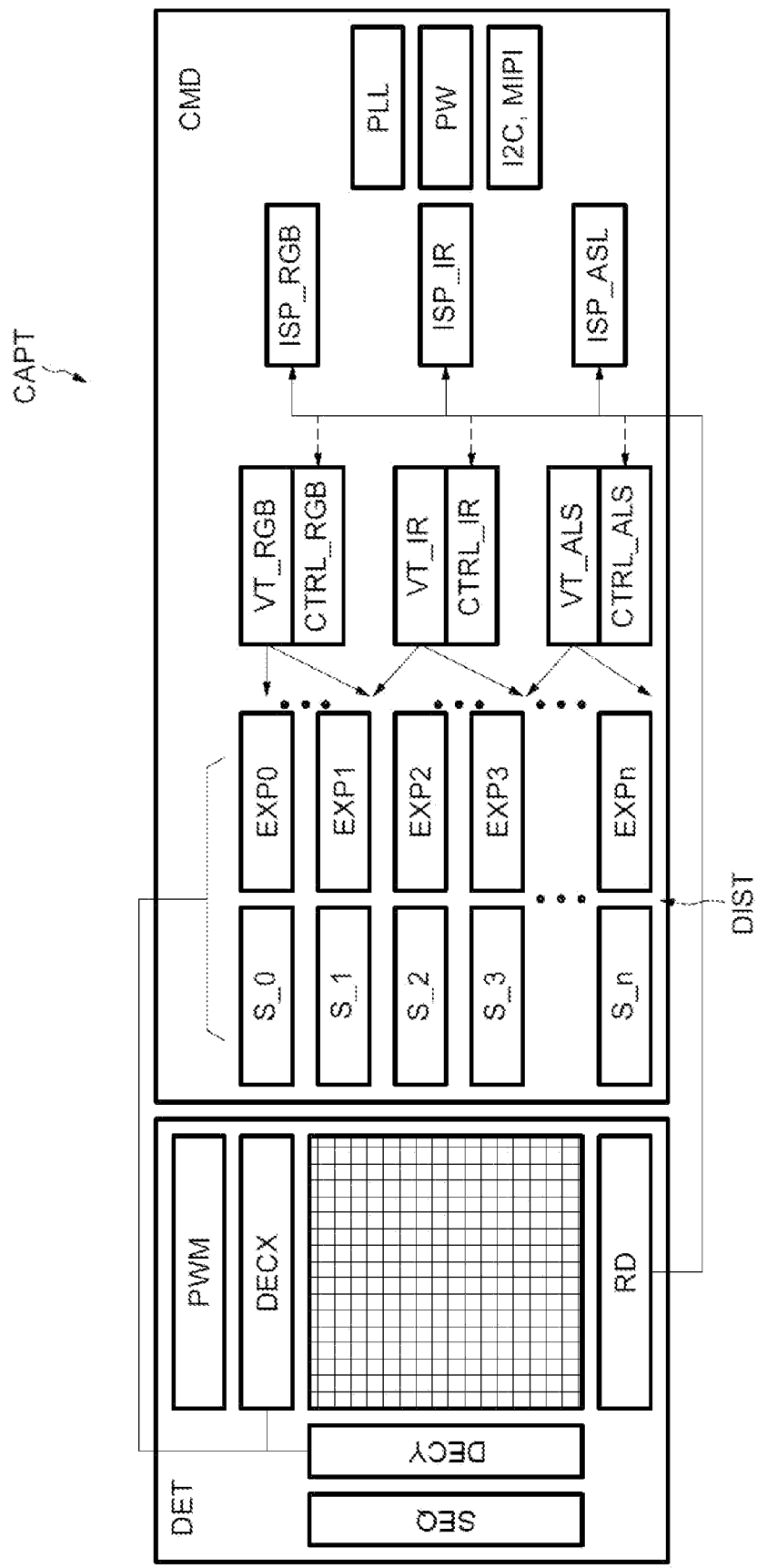
FIG. 7 illustrates an example of an image sensor of the same type as that described in connection with FIGS. 3, 4, and 6, wherein the array of pixels includes both pixels dedicated to the visible spectrum, pixels dedicated to the infrared, and pixels dedicated to the measurement of information on the ambient luminosity.

FIG. 7 illustrates an example of the image sensor CAPT, of the same type as that described in connection with FIGS. 3, 4, and 6, wherein the array of pixels RES includes both pixels dedicated to the visible spectrum, pixels dedicated to the infrared, and pixels dedicated to the measurement of information on the ambient luminosity.

The elements common with the examples of image sensor CAPT described in connection with FIGS. 3, 4, and 6 bear the same references, and not all of them will be detailed again.

The array of pixels RES may comprise subdivisions in each set of pixels, each corresponding to a local region of the array (FIG. 6).

Thus, the image sensor CAPT includes at least one first set of pixels E_RGB configured to detect components of the visible spectrum of the incident optical signal, the corresponding video timing circuit VT_RGB being configured to respectively generate at least one first timing signal S_0-S_n, respectively distributed in the at least one first set of pixels; at least one second set of pixels E_IR configured to detect an infrared component of the incident optical signal, the corresponding video timing circuit VT_IR being configured to respectively generate at least one second timing signal S_0-S_n, respectively distributed in the at least one second set of pixels; at least one-third set of pixels E_ALS configured to measure information on the ambient luminosity of the incident optical signal, the corresponding video timing circuit VT_ALS being configured to respectively generate at least one-third timing signal S_0-S_n, respectively distributed in the at least one-third set of pixels.

In this general case, the detection circuit DET includes a row detector DECY and a column detector DECX, belonging to the distribution circuit DIST, configured to access the rows selectively and the columns of the array of pixels corresponding to the different sets of pixels.

In absolute terms, one timing signal per pixel of the array RES may be provided for in this embodiment, for example, to control the optimum time of exposure for the received amount of light independently of each pixel, forming an "HDR" (standing for "High Dynamic Range") image sensor CAPT.

For practical reasons, the row and/or column decoders may be configured to specifically access the sets of pixels as these are arranged in the array. In this respect, in the present example, the row decoder DECY may include two decoders, each intended for one half of the array as described in connection with FIG. 6, and each capable of distributing the timing signals in the manner described in connection with FIGS. 1 and 3. The column decoder may include the decoder DEC_ALS dedicated to the third group of pixels and described in connection with FIG. 4.

Figure 8:
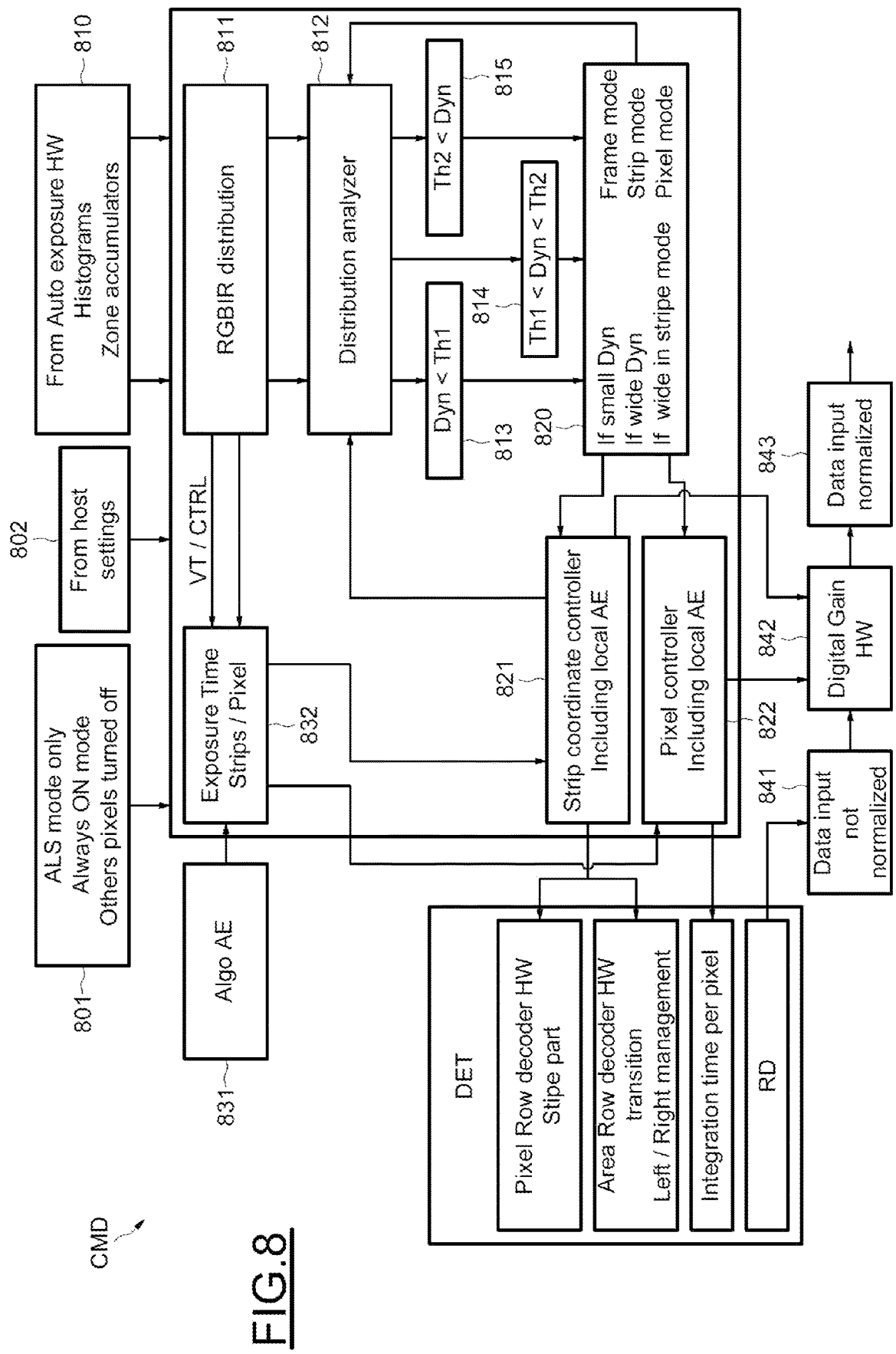
FIG. 8 illustrates an embodiment of the control circuit, in particular, the video timing circuits associated with the different types of pixels.

FIG. 8 illustrates an advantageous embodiment of the control circuit CMD, in particular, the video timing circuits VT/CTRL associated with the different types of pixels, i.e., the pixel type dedicated to the visible colors R, G, and B, the pixel type dedicated to the infrared IR, or the pixel type dedicated to the multispectral components of the measurement of the ambient luminosity ALS.

The reading circuit RD is configured to provide read signals resulting from acquiring an incident optical signal by the pixels of the array RES, for example, during successive acquisitions of a video stream.

The readout RD provides non-normalized raw read signals 841. Starting from these read signals 841, an auto-exposure mechanism 810, carried out by a hardware automaton, is configured to provide, for example, histograms, the distribution of the amplitudes of the read signals 811.

The video timing circuit VT/CTRL is configured to assess 812 the dynamics of the image from the distribution of the amplitudes of the read signals 811. For example, the dynamics of the image may be assessed and quantified in connection with the width of the distribution of the amplitudes of histogram 811. In this respect, statistical filters may be implemented.

The distribution analysis circuit 812 is configured to detect 813 whether the dynamics of the image Dyn is lower than a first threshold Th1, to detect 814 whether the dynamics of the image Dyn is comprised between the first threshold Th1 and a second threshold Th2 and to detect 814 whether the dynamics of the image Dyn is higher than the second threshold Th2.

The decision circuit 820 is configured to set the control and distribution circuit in a frame mode if the dynamics are lower than a first threshold 813, in a band mode 821 if the dynamics are comprised between the first threshold and a second threshold 814, and in a pixel mode 822 is the dynamics is higher than the second threshold 815, for the next acquisition of the incident optical signal.

In the frame mode, the control CMD and distribution DIST circuits are configured to generate timing signals adapted to control a unique time of exposure and distribution of these timing signals to all the pixels of the array RES. Thus corresponds to a conventional control, for example of the global shutter type, which is not necessarily of the "HDR" ("High Dynamic Range") type.

In band mode 821, the decision circuit 820 activates, within the control CMD and distribution DIST circuits, a coordinates controller of sets of bands of pixels 821, i.e., the bands of rows STRP0, STRP1, STRPm. Advantageously, the coordinate controller of the sets of bands of pixels 821 may incorporate local auto-exposure mechanisms "AE," i.e., dedicated to each set of pixels STRP0, STRP1, STRPm.

The coordinate controller of the sets of bands of pixels 821 is configured to generate as many different timing signals S0, S_1, . . . , S_n as there are sets of pixels and to distribute these timing signals in the sets of pixels STRP0, STRP1, . . . , STRPn each corresponding to one region of the array including several adjacent rows. For example, this corresponds to the control described before in FIGS. 6A, 6B, and 6C.

In the pixel mode 822, the decision circuit 820 activates, within the control CMD and distribution DIST circuits, a coordinate controller of sets of pixels 822, i.e., the sets of at least one pixel E_L1, E_L2, E_RGB, E_ALS. Advantageously, the coordinate controller of the sets of pixels 822 may incorporate local auto-exposure mechanisms "AE," i.e., dedicated to each set of pixels E_L1, E_L2, E_RGB, E_ALS.

The coordinate controller of the sets of pixels 822 is configured to generate the respective timing signals S_0, S_1, . . . , S_n, at each set of at least one pixel and to distribute these timing signals in the sets of at least one respective pixel of the array RES. For example, this corresponds to the control described in FIGS. 3 to 5.

For each mode, the local auto-exposure mechanisms "AE" are configured to adjust the times of exposure controlled by the timing signals of a subsequent acquisition according to the read signals resulting from a prior acquisition, respectively in each of the different sets of pixels.

For example, the adjustment of the times of exposure performed by the local "AE" may be set by an auto-exposure algorithm 831 providing the values of the times of exposure 832 per set of bands of pixels or sets of at least one pixel, starting from the histograms of the distribution of the amplitudes of the read signals 811.

Moreover, the coordinate controllers of the sets of pixels 821 and 822 may be configured to transmit to the image signal digital processor circuit ISP_RGB the different durations of the times of exposure and the different coordinates of the respective sets of pixels.

Thus, the image signal digital processor circuit ISP_RGB may apply to the read signals the gain adapted to compensate for the different times of exposure 842, to provide normalized image data 843, in particular in terms of luminance, luminosity, and possibly in terms of color temperature such as the white balance.

Moreover, the video timing circuit VT/CTRL may provide for other operating modes 801, such as a mode dedicated solely to the pixels of the ambient luminosity sensor ALS, wherein the pixels dedicated to the multispectral components are always controlled to be active, whereas the other pixels of the array are deactivated.

And besides, other parameters of the video timing circuit VT/CTRL may be configured 802 by a "host" process, i.e., a master process adapted to control and configure the image sensor.

FIG. 9A illustrates an embodiment of the pixels MPG1, MPG2, MPB, and MPR of the array RES, particularly advantageous in collaboration with the implementations of image captures described before in connection with FIGS. 1 to 8.

In this example, an approach is proposed in which the array of pixels RES is capable of performing, in a common integration, a high dynamic range acquisition of the incident optical signal with two different dynamics and with a low-noise read signal, in particular for low luminosities.

In this respect, the pixels PG11-PG14, PB1-PB4, PR1-PR4, and PG21-PG22 of the array include a photosensitive semiconductor region PPD, a transfer gate MTG coupled between the photosensitive region and a transfer node SN (usually called "sense node").

In this example, the pixels of the array are advantageously in a so-called "4T" architecture, wherein the photosensitive semiconductor region is, for example, a pinched photodiode PDD, the transfer gate MTG is controlled by a signal TGB<n> decoded per row. That being so, the control signal of the transfer gate TGB<n> may be decoded per sets of pixels, as described before in connection with FIGS. 1 to 8.

The transfer gate MTG allows transferring the charges photogenerated by the photodiode PPD towards the transfer node SN, usually a floating diffusion node.

The transfer node SN has a capacitive value CSN1, CSN2 defining a charge-to-voltage conversion factor CVF1, CVF2 of each pixel.

The charges transferred on the transfer node SN allow controlling a first source-follower transistor MPX, polarising a reading node CN by a reading polarisation signal VD<n>.

In turn, the reading node CN has a capacitive value CCN1, and also allows controlling a reading source-follower transistor MSF between a read signal VRT and a reading row VX<y> decodable per column. A selection circuit (not represented) may be provided for the reading node CN, in particular, to implement a correlated double-sampling reading.

Moreover, a reset transistor MRT is coupled on the transfer node SN to apply a reset voltage VPIX<n> thereto adapted to rest the charge of the transfer node SN at the beginning of integration.

In particular, the charge-to-voltage conversion factor CVF1, CVF2 of each pixel is inversely proportional to the capacitive value CSN1, CSN2 on the transfer node and proportional to the gain of the first source-follower transistor MPX, i.e., "CVF~q*SFgain/CSN."

Thus, a decrease in the capacitive value of the transfer node CSN1, CSN2 allows for increasing the charge-to-voltage conversion factor CVF1, CVF2. That being so, it is desirable that the ratio between the capacitive value of the transfer node CSN1 and CSN2 to the capacitive value of the reading node CCN1 and CCN2 remains the same. Thus, the decrease in the capacitive value of the transfer node CSN1, CSN2 may be accompanied by a decrease in the same proportion of the capacitive value of the reading node CCN1, CCN2.

The capacitive value CSN of the transfer node SN is composed of the intrinsic capacitive value of the transfer node SN (for example, the capacitance of the floating diffusion node). Still, also the parasitic capacitive values of the architecture of the circuit, such as the intrinsic capacitive values of the transistors coupled to the transfer node SN; furthermore, a reinforcing capacitive element may be coupled to the transfer node SN.

The charge-to-voltage conversion factor CVF1, CVF2 may be considered as the gain of the sensitivity of the pixel, which reflects the smallest amount of photogenerated charge producing a voltage signal detectable by the reading circuit, or the "threshold" or the detection "step." The greater the charge-to-voltage conversion factor, the higher the signal-to-noise factor (the lower the noise will be).

As a corollary, the charge-to-voltage conversion factor CVF1, CVF2 also defines the maximum amount of charge photogenerated at saturation (usually called "fullwell"), i.e., the amount of charge producing the maximum voltage specified on the transfer node SN or the reading node CN.

In the array RES, the pixels are arranged according to a periodic pattern of macro-pixels MPG1, MPB, MPR, MPG2, each including at least one first pixel PG11, PG14, and at least one second pixel PG12, PG13. For example, each macro-pixel MPG1, MPB, MPR, and MPG2 includes a square of four pixels 2×2, including two first pixels and two second pixels. Each macro-pixel is dedicated to one component of the detected spectrum, for example, the red, green, blue, or infrared components.

In each macro-pixel MPG1, MPB, MPR, MPG2, the at least one first pixel PG11, PG14 and the at least one second pixel PG12, PG13 are dedicated to the same component.

The capacitive value CSN1 of the transfer node of the at least one first pixel PG11, PG14 defines a first charge-to-voltage conversion factor CVF1. In contrast, the capacitive value CSN2 of the transfer node of the second node PG12, PG13 defines a second charge-to-voltage conversion factor CVF2 different from the first charge-to-voltage conversion factor CVF1.

In this example, each of the macro-pixels (respectively MPG1; MPB; MPR, MPG2) includes two first pixels (respectively PG11, PG14, PB1, PB4, PR1, PR4, PG21, PG24) in a diagonal of the 2×2 square, and two second pixels (respectively PG12, PG13, PB2, PB3, PR2, PR3, PG22, PG23) in the other diagonal of the 2×2 square.

For example, it is considered that the first charge-to-voltage conversion factor CVF1 is greater than the second charge-to-voltage conversion factor CVF2.

Thus, in each macro-pixel, the first pixels have a finer sensitivity and a better signal-to-noise ratio than the second pixels. In contrast, the second pixels have a larger charge at saturation "fullwell."

Consequently, in each macro-pixel, the high dynamic range HDR function is obtained in a unique integration thanks to a spatial distribution of the different charge-to-voltage conversion factors CVF1 and CVF2 in the first and second pixels. In particular, this differs from conventional high dynamic range HDR acquisition techniques wherein the dynamics of the acquisitions are distributed overtime, i.e., the dynamics of the pixels of the array are modified between two distinct and typically successive over time integrations.

Consequently, the high dynamic range HDR function obtained by the spatial distribution of the charge-to-voltage conversion factors CVF1 and CVF2 is adapted to a unique global shutter type acquisition.

Advantageously, the image signal digital processing ISP is configured to recover the information of a pixel of the final image from the first and second pixels of the blocks of 2×2 macro-pixels. In particular, and as it will be described hereinafter in connection with FIGS. 10 and 11, the image signal digital processing ISP may provide for a calculation of alignment of the luminosity from a selection of the values of the first and second pixels of each macro-pixel, and a filtering to reduce artifacts.

It should be noted that the obtainment of the low-noise high dynamic range HDR reduces the resolution of the array. That being so, some applications have considerable needs in terms of dynamic range and low noise and little constraints on the resolution, some applications impose a low resolution (limited processing and storage capacity), and the technological advances in terms of pixel size reduction allow compensating for the reduction of the resolution in the significantly acceptable manner on the final image.

Furthermore, it is particularly advantageous to implement the image capture, the control CMD and distribution DIST circuits described before in connection with FIGS. 1 to 8, for which the different sets of pixels correspond to the pixels having different charge conversion factors CVF1, CVF2.

Indeed, the control CMD and distribution DIST circuits configured to generate a first timing signal A controlling a first time of exposure A in the first pixels of the macro-pixels of the array RES and to generate a second timing signal B controlling a second time of exposure B in the second pixels of the macro-pixels of the array RES, during the same acquisition of an incident optical signal, allow for the read signals derived from each macro-pixel to provide information with even higher high dynamic range HDR (simultaneously in one single acquisition) and with low noise in the low luminosities.

In this context, and when the first charge-to-voltage conversion factor CVF1 is greater than the second charge-to-voltage conversion factor CVF2, the first time of exposure A is advantageously selected to be longer than the second time of exposure B.

Thus, the high dynamic range HDR effects obtained by the spatial distribution of the charge-to-voltage conversion factors and by the distribution of the exposure times of the same acquisition, amplify each other while providing a high signal-to-noise ratio.

Figure 9B:
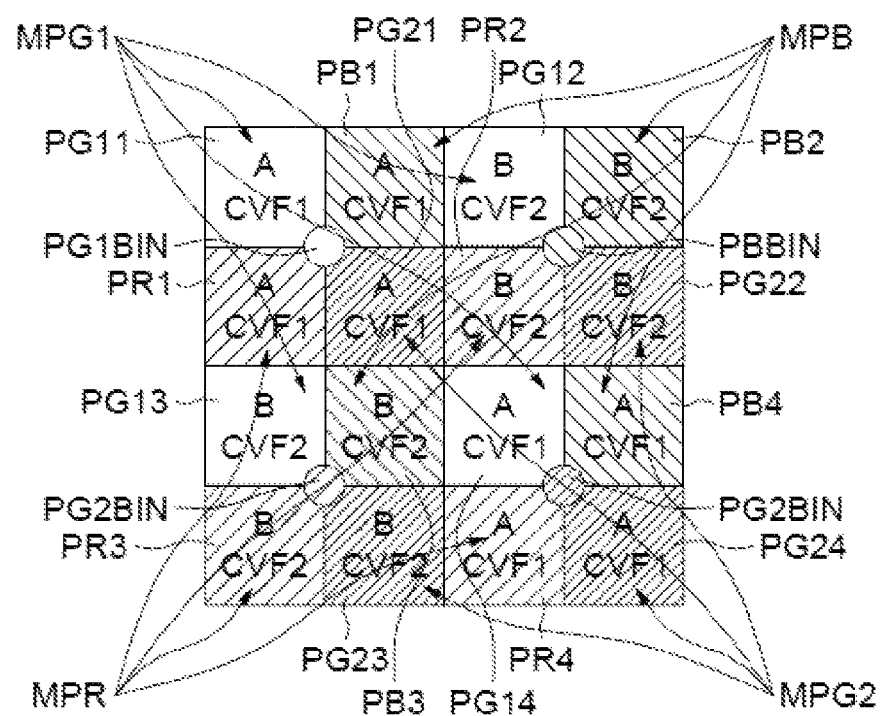
FIG. 9B illustrates an example of a periodic pattern of the macro-pixels described before in connection with FIG. 9A.

FIG. 9B illustrates an example of a periodic pattern of the macro-pixels MPG1, MPB, MPR, and MPG2 described before in connection with FIG. 9A.

In this preferred example, the periodic pattern of macro-pixels MPG1, MPB, MPR, MPG2 includes four macro-pixels respectively dedicated to four respective components, for example, the green component for the macro-pixel MPG1, the blue component for the macro-pixel MPB, the red component for the macro-pixel MPR, and a second time the green component for the macro-pixel MPG2, or alternatively the infrared component for the macro-pixel MPG.

Each macro-pixel includes two first pixels and two second pixels, i.e., the first pixels PG11, PG14 and the second pixels PG12, PG13 in the macro-pixel MPG1; the first pixels PB1, PB4 and the second pixels PB2, PB3 in the macro-pixel MPB; the first pixels PR1, PR4 and the second pixels PR2, PR3 in the macro-pixel MPR; the first pixels PG21, PG24 and the second pixels PG22, PG23 in the macro-pixel MPG2.

The first pixels and second pixels of the macro-pixels of the pattern are positioned to be contiguous only to the first or second pixels of another macro-pixel of the same pattern.

Thus, in this example, the four macro-pixels of the pattern occupy a square of 4×4 pixels, each including four pixels at the four corners of a square of 3×3 pixels.

In this example, the first pixels (respectively: PG11, PG14; PB1, PB4; PR1, PR4; PG21; PG24) are located in the diagonally-opposite corners of the 3×3 square of each macro-pixel, and the two second pixels (respectively PG12, PG13; PB2, PB3; PR2, PR3; PG22; PG23) are located in the opposite corners in the other diagonal of the 3×3 square of each macro-pixel.

Thus, in the pattern of 4×4 pixels, the first pixels PG11, PG14; PB1, PB4; PR1, PR4; PG21; PG24 are grouped in two squares of 2×2 pixels in diagonal, and the second pixels PG12, PG13; PB2, PB3; PR2, PR3; PG22; PG23 are grouped together by two squares of 2×2 pixels in the other diagonal.

Thus advantageously allows simplifying the design of the distribution circuit distributing the first and second control signals A, B, towards the respective first and second pixels in a grouped manner for the four macro-pixels.

It should be recalled that the first pixels PG11, PG14; PB1, PB4; PR1, PR4; PG21; PG24 of the pattern have a first charge-to-voltage conversion factor CVF1, whereas the second pixels PG12, PG13; PB2, PB3; PR2, PR3; PG22; PG23 of the pattern have a second charge-to-voltage conversion factor CVF2 different from the first charge-to-voltage conversion factor CVF1.

It should also be recalled that the first time of exposure A, longer than the second time of exposure B, is advantageously associated with the pixels having the first charge-to-voltage conversion factor CVF1 greater than the second charge-to-voltage conversion factor CVF2.

In one alternative, each macro-pixel MPG1, MPB, MPR, MPG2 could ultimately provide a high dynamic range read data of the respective component PG1BIN, PBBIN, PRBIN, PG2BIN, based on the first read data originating from the first pixels and on the second read data originating from the second pixels, in particular upon completion of a binning processing. Nevertheless, this divides the end resolution by four.

In a preferred alternative, the digital processing described hereinafter in connection with FIGS. 10 and 11 enables the reconstruction of a high dynamic range image without losing resolution.

Figure 10:
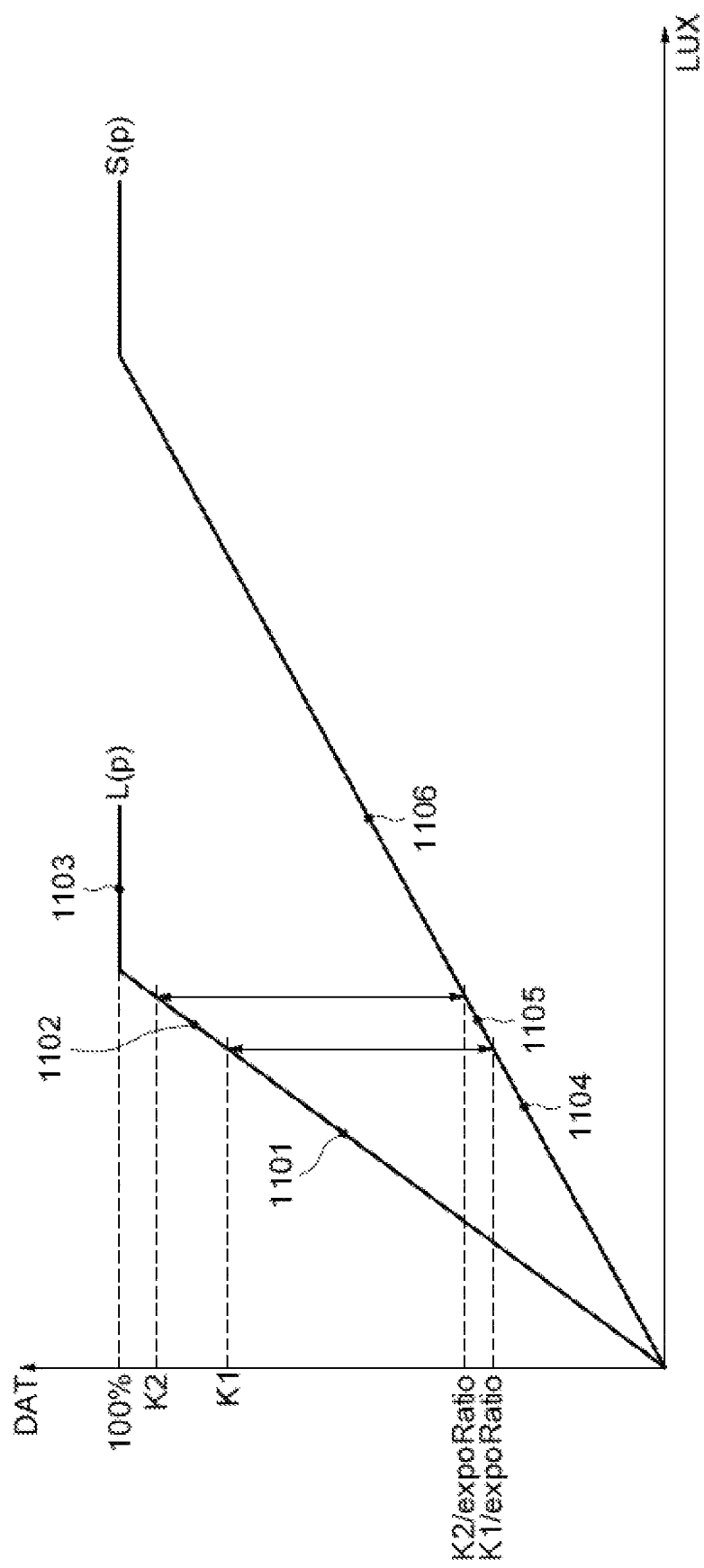
FIG. 10 schematically illustrates the amplitude of the first read data and the second read data as a function of the luminance of the incident signal, each according to the respective pair.
Figure 11:
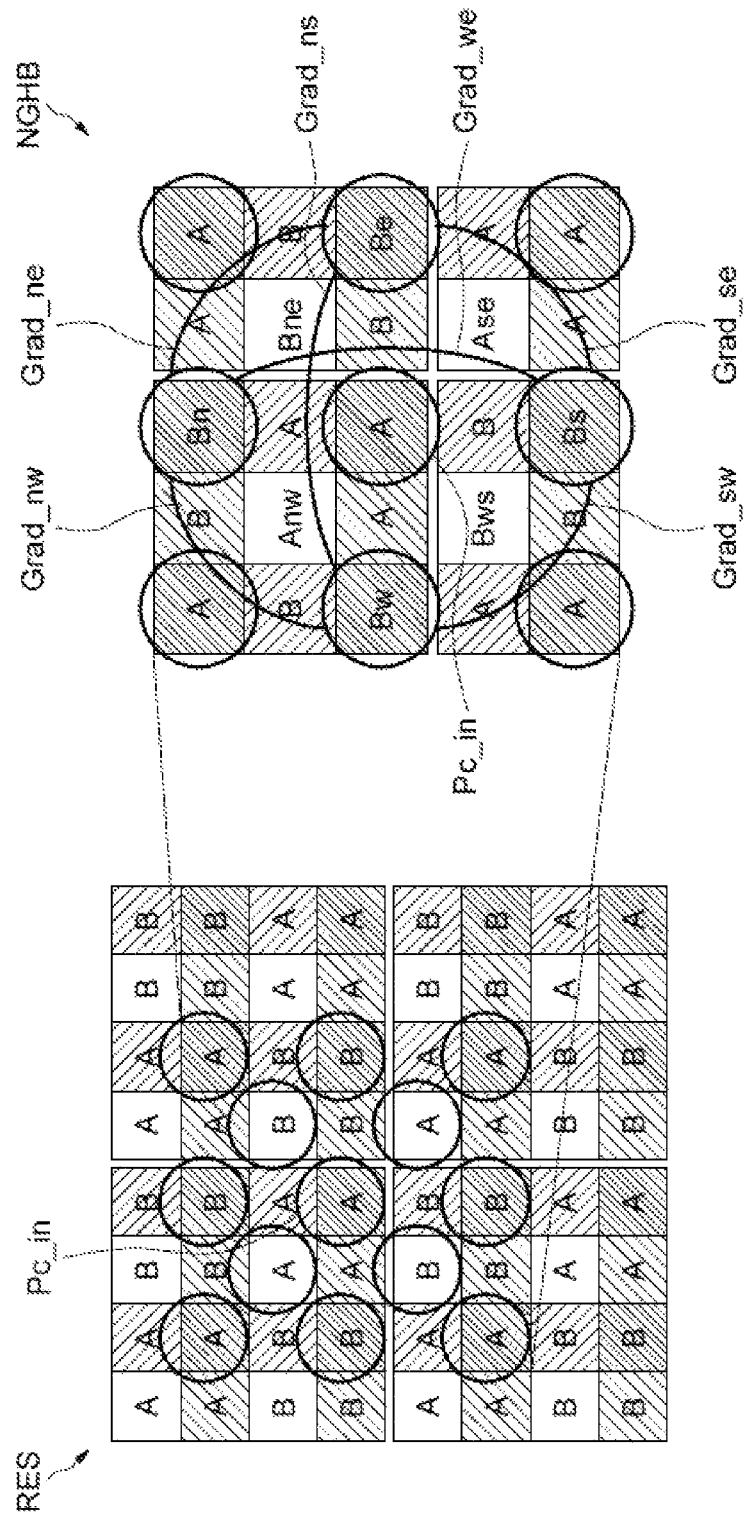
FIG. 11 illustrates an advantageous example of obtainment of the substitution values described hereinbefore in connection with FIG. 10.

FIGS. 10 and 11 illustrate an example of the implementation of a digital processing of the image signals ISP, for example, as mentioned before in connection with FIGS. 3 to 8. In particular, the digital processing of the image signals ISP may provide for a normalization allowing aligning the luminosity according to the respective times of exposure through a selection of the values of the first and second pixels of the macro-pixels described before in connection with FIGS. 9A and 9B, and, in some cases, an interpolation comprising a weighted-average filtering to reduce artifacts perceivable by the human eye.

Consider the preferred example of the image sensor CAPT including the array of pixels RES described before in connection with FIG. 9B.

Thus, the method for capturing an image with the image sensor CAPT comprises a generation and a distribution of a first timing signal A and of a second timing signal B, different and adapted to control, respectively, a first time of exposure A in the first pixels PG11, PG14; PB1, PB4; PR1, PR4; PG21; PG24 of the macro-pixels of the array RES, and a second time of exposure B in the second pixels PG12, PG13; PB2, PB3; PR2, PR3; PG22; PG23 of the macro-pixels of the array RES, during the same acquisition of an incident optical signal.

Consider that the first time of exposure A is longer than the second time of exposure B.

During a reading phase RD, the first pixels of the array RES generate read signals communicating the first read data L(p), and the second pixels of the array RES generate read signals communicating the second read data S(p).

The read data correspond to a measurement of the amount of photogenerated charges representative of the number of incidents over the duration of the acquisition, according to the position of each pixel, and also according to the time of exposure of each pixel and according to the sensitivity of each pixel (charge-to-voltage conversion factor CVF1, CVF2).

The image capture method advantageously comprises digital processing, including reconstructing a high dynamic range "HDR" image. On the one hand, the reconstruction comprises an application of a respective normalization gain to each read data Pc_in, the respective normalization gains being adapted to compensate for the difference between the respective times of exposure of the pixels of the array.

It should be recalled that the first time of exposure A, longer than the second time of exposure B, is advantageously associated with the pixels having the first charge-to-voltage conversion factor CVF1 greater than the second charge-to-voltage conversion factor CVF2.

Thus, consider that the reading phase provides two types of data: the first read data L(p) having the first time of exposure A (longer) and with the first pixels having the first charge-to-voltage conversion factor CVF1 (more sensitive); and the second read data S(p) having the second time of exposure B (shorter) and with the first pixels having the second charge-to-voltage conversion factor CVF2 (less sensitive).

For concision, the pair "first time of exposure A and first charge-to-voltage conversion factor CVF1" will be referred to as "A-CVF1 pair" or as "first time of exposure A"; and the pair "second time of exposure B and second charge-to-voltage conversion factor CVF2" will be referred to as "B-CVF2 pair" or as "second time of exposure B."

Consequently, in the "normal case," i.e., for a read data Pc_in that is neither overexposed nor underexposed, a first gain GL(p) is provided to compensate the first pair A-CVF1 of the first read data L(p) originating from the first pixels. In contrast, a second gain GS(p) allows compensating the second pair B-CVF2 of the second read data S(p) originating from the second pixels.

The ratio expoRatio=A/B of the first time of exposure A (i.e., first pair A-CVF1) to the second time of exposure B (i.e., second pair B-CVF2) is defined.

Two thresholds, or "inflection points," K1 and K2, bordering the overexposure and underexposure cases are defined.

In this respect, reference is made to FIG. 10.

FIG. 10 schematically illustrates the amplitude DAT of the first read data L(p) and of the second read data S(p), as a function of the luminance LUX of the incident signal, and each according to the respective pair A-CVF1, B-CVF2.

The first threshold K1, for example, set at 95% of the maximum amplitude (100% DAT) of the first read data L(p) corresponds to an amplitude K1/expoRatio of the second read data S(p), below which the second read data S(p) are in an underexposure condition, at an equal luminance, like for example at the point 1104.

The second threshold K2, for example, set at 98% of the maximum amplitude (100% DAT) of the first read data L(p) corresponds to the amplitude of the first read data L(p) above which the first read data L(p) are in an overexposure condition, like for example at the point 1103.

Thus, starting from the thresholds K1 and K2 for the first read data L(p) and K1/expoRatio and K2/expoRatio for the second read data S(p), it is possible to identify six exposure limit conditions on the read data Pc_in (illustrated for example 1101, 1102, 1103, 1104, 1105, 1106).

And, the gain applied to each read data Pc_in is selected depending on the condition in which the read data Pc_in is identified.

Furthermore, in so-called exposure limit conditions, comprising in particular overexposure conditions, underexposure conditions, or near-limit conditions, the read data Pc_in could advantageously be replaced by substitution data Pc_out. The substitution data Pc_out is estimated by calculation from the read data resulting from acquisition with neighboring pixels of the array dedicated to the same component before applying the normalization gain.

A first "normal" condition, for example, met at point 1101, could be expressed: if Pc_in=L(p) and L(p)<K1, then Pc_out=L(p)*GL(p).

Thus means that when the read data Pc_in results from an acquisition with the first time of exposure A "Pc_in=L(p)," and if the read data Pc_in has a value lower than the first threshold K1 "L(p)<K1," then the gain applied to the read data Pc_in is the first gain GL(p).

A second "normal" condition, for example, met at point 1106, could be expressed: if Pc_in=S(p) and S(p)>K2/expoRatio, then Pc_out=S(p)*GS(p).

Thus means that when the read data Pc_in results from acquisition with the second time of exposure B "Pc_in=S(p)," and if the read data Pc_in has a value higher than the second threshold K2/expoRatio "S(p)>K2/expoRatio 1," then the gain applied to the read data Pc_in is the second gain SL(p).

The overexposure condition, for example, met at point 1103, could be expressed: if Pc_in=L(p) and (L(p)>K2), then Pc_out=Swghtd(Pc_in)*GS(p).

With Swghtd(Pc_in) as a substitution value, replacing the data Pc_in, for example, calculated by weighted-average filtering from the read data resulting from acquisition with the second time of exposure B of neighboring pixels, advantageously as described hereinafter in connection with FIG. 11.

Thus means that when the read data Pc_in results from acquisition with the first time of exposure A, and if the read data Pc_in has a value higher than the second threshold K2, then the corresponding substitution data Swghtd(Pc_in) is determined from the read data resulting from acquisition with the second time of exposure B of neighboring pixels. The second gain GS(p) is applied to the substitution data Swghtd(Pc_in).

The underexposure condition, for example, met at point 1104, could be expressed:

if Pc_in=S(p) and S(p)<K1/expoRatio, then
Pc_out=Lwghtd(Pc_in)*GL(p).

With Lwghtd(Pc_in) as a substitution value replacing the data Pc_in, for example, calculated through a weighted-average operation from the read data resulting from acquisition with the first time of exposure A of neighboring pixels, advantageously as described hereinafter in connection with FIG. 11.

Thus means that when the read data Pc_in results from acquisition with the second time of exposure B, and if the read data Pc_in has a value lower than the first threshold K1/expoRatio, then the corresponding substitution data Lwghtd(Pc_in) is determined from the read data resulting from acquisition with the first time of exposure A of neighboring pixels. The first gain GL(p) is applied to the substitution data Lwghtd(Pc_in).

The exposure near-limit condition, for example, met at points 1102 or 1105, could be expressed:

if Pc_in=L(p) and [K1≤sL(p)≤K2], then Pc_out=α*Lwghtd(Pc_in)*GL(p)+β*Swghtd(Pc_in)*GS(p)

or if Pc_in=S(p) and [K1/expoRatio≤sL(p)≤K2/expoRatio], then c_out=α*Lwghtd(Pc_in)*GL(p)+β*Swghtd(Pc_in)*GS(p).

With α and β two complementary coefficients (β=(1−α); α+β=1), respectively representative of the distance between the data Pc_in (points 1102, 1105) and the thresholds K1, K2.

Thus means that when the read data Pc_in has a value comprised between the first threshold and the second threshold K1, K2; K1/expoRatio, K2/expoRation, then the corresponding substitution data is determined from read data resulting from an acquisition with the first time of exposure A of neighboring pixels and also from read data resulting from an acquisition with the second time of exposure B of neighboring pixels.

Reference is now made to FIG. 11.

FIG. 11 illustrates an advantageous example of obtainment of the substitution values Lwghtd(Pc_in) and Swghtd(Pc_in) described hereinbefore in connection with FIG. 10.

The determination of the substitution data B_out=Lwghtd(Pc_in) or B_out=Swghtd(Pc_in) comprises calculating a weighted average value of the read data resulting from acquisition with neighboring pixels of the pixel Pc_in in the array RES. Advantageously, the weights are assigned to the read data according to an orientation of the spatial variations in the HDR image in the neighborhood NGHB of the pixel from which the read data Pc_in is derived.

The illustrated example corresponds to the case where the read data to be replaced Pc_in is a first read data L(p), i.e., resulting from acquisition with a first pixel and the first time of exposure A. The pixel from which the read data Pc_in is derived is located in the middle of its neighborhood NGHB. The neighborhood NGHB corresponds, for example, to a square of 5×5 pixels.

The neighboring pixels belonging to the neighborhood NGHB and dedicated to the same component, and having performed the acquisition with the second time of exposure B, are referred to by their cardinal positions "north" Bn, "south" Bs, "east" Be, "west" Bw, as well as "north-east" Bne, and "south-west" Bws, concerning the pixel to be replaced Pc_in.

For example, the orientation of the spatial variations in the image is obtained by calculating gradients Grad_ns, Grad_we, Grad_nw, Grad_ne, Grad_sw, Grad_se.

For example, each gradient corresponds to the oriented difference (while taking the sign into account) of the values of the pixels corresponding to the respective cardinal points, i.e.:

Grad_ns=Bn−Bs; Grad_we=Bw−Be; Grad_nw=Bn−Bw; Grad_ne=Bn−Be; Grad_sw=Bs−Bw; Grad_se=Bs−Be; Grad_ws_ne=Bws−Bne.

The determination, done according to an orientation of the spatial variations in the HDR image, is implemented, for example, by the following algorithm:

```
If Max(Grad_i) = Grad_ns, then:
if Grad_ns ~= Grad_nw ~= Grad_ne, then B_out = F(Bs;Bw;Be)
else, if Grad_ns != Grad_nw and Grad_ns != Grad_ne, then B_out = F(Bn;Bw;Be).
  Else, if Max(Grad_i) = Grad_we, then:
if Grad_we ~= Grad_nw ~= Grad_sw, then B_out = F(Be;Bn;Bs)
else, if Grad_we != Grad_nw and Grad_we != Grad_sw, then B_out = F(Bw;Bn;Bs).
  Else, if Grad_ns ~= Grad_we, then:
if Grad_nw ~= Grad_se ~= Grad_ws_ne, then B_out = F(Be;Bn;Bs;Bw; Bws;Bne)
else, B_out = F(Be, Bn, Bs, Bw).
```

Where "Max(Grad_i)" means "the maximum value amongst the gradients Grad_ns, Grad_we; namely i=[ns; we]"; where "~=" means "equal or close by less than 5%"; where "!=" means "different from"; and where the function "F(Bx;By;Bz)" is a weighted average function including the barycentre to spatially distribute the weight values based on the inverse of the differences.

In this respect, in the function F(Bx;By;Bz), for example, applied by F(Bw, Bn, Be), an intermediate average value "Binter" is calculated between the two neighboring pixels aligned with the processed pixel Pc_in, i.e. the pixels Bw and Be in this example. Then, the weight Wi (in this example "i"="w" or "n" or "e" respectively) is assigned to each neighboring pixel Bi by the following calculation Wi=d/(1+abs(Bi−Binter)) with "abs( )" the "absolute value" function and "d" the distance between the processed pixel Pc_in and the neighboring pixel Bi (d=1 laterally, and d=$2^{1/2}$ diagonally).

In summary, this algorithm first identifies the orientation amongst the directions "ns" and "we" in which the image has the greatest variations, in the neighborhood NGHB of the pixel Pc_in.

If the orientation having the greatest variation is "ns" (resp. "we"), then we check-up whether the variations "nw" and "ne" (resp. "nw" and "sw") could be compared to the variation "ns" (resp. "we").

If so is the case, we consider that the location of Pc_in as well as the locations of Bw and Be (resp. Bn and Bs) belong to the portion of the image located on the "s" (resp. "e") side of the variation. We use the data Bs, Bw, Be (resp. Be, Bn, Bs) for the determination of the substitution data B_out.

Otherwise, we consider that the location of Pc_in, as well as the locations of Bw and Be (resp. Bn and Bs) belong to the portion of the image located on the "n" (resp. "w") side of the variation, and we use the data Bn, Bw, Be (resp. Bw, Bn, Bs) for the determination of the substitution data B_out.

Finally, if the variations of the image in the neighborhood NGHB of the pixel Pc_in are substantially equal in the orientations "ns" and "we," and if, in addition, the variations in the orientations "nw," "es" and, in particular for the green pixels, in the orientation between the diagonally-neighboring pixels Bws and Bne are substantially equal, then we consider that this region of the image NGHB has no substantial variation. We use all of the read data originating from the neighboring pixels for the determination. It is further possible to use the read data of the first two pixels Anw, Ase, diagonally neighboring the processed pixel Pc_in, brought to their equivalent values in terms of second read data (by dividing them by the ratio expoRatio=A/B).

If, on the contrary, in particular for green pixels, the variations in the orientation between the neighboring pixels Bws and Bne are not substantially equal to the variations in the other orientations, then we do not use the pixels Bws and Bne for the determination.

Finally, although the example described in connection with FIG. 11 is given for a first read data Pc_in derived from a first pixel, i.e., a pixel according to the first pair A-CVF1, the second read data Pc_in derived from the second pixels, i.e., the pixels according to the second pair B-CVF2, are processed with the same algorithm wherein the used neighboring read data will be the first read data derived from the first neighboring pixels ("An," "Aw," "Ae," "As," and possibly "Aws," "Ane," "Bnw," "Bse").

Moreover, in the digital processing of the image signals described in connection with FIGS. 10 and 11, the exposure limit conditions are assessed pixel-by-pixel (read data Pc_in by read data Pc_in).

That being so, the exposure limit conditions could alternatively be assessed by groups of pixels, such as the group including the neighborhood NGHB of FIG. 11. In other words, it is possible to consider the average of the amplitude of the first (resp. second) read data L(p) (resp. S(p)) to classify the point 1101-1106 of the group NGHB and calculate the possible substitution data in a corresponding manner for all pixels of the group NGHB.

In another alternative, the exposure limit conditions could be assessed on the maximal value of the first read data L(p) of a group NGHB of first pixels, and respectively on the minimum value of the second read data S(p) of a group NGHB of second pixels, to classify the point 1101-1106 of the group NGHB and calculate the possible substitution data in a corresponding manner for all pixels of the group NGHB.

Examples of embodiments and implementation of different aspects of the invention have been described. That being so, the invention is not limited to these examples but encompasses all variants thereof and combinations between the different aspects disclosed in connection with FIGS. 1 to 11.

Example embodiments of the invention are summarized here. Other embodiments can also be understood from the entirety of the specification.

Example 1. An image sensor including an array of photosensitive pixels comprising at least two sets of at least one pixel, a control circuit configured to generate at least two different timing signals and adapted to control an acquisition of an incident optical signal by the pixels of the array, and distribution circuit configured to respectively distribute the at least two different timing signals in the at least two sets of at least one sensor, during the same acquisition of the incident optical signal.

Example 2. The image sensor according to example 1, wherein the timing signals are adapted to control a time of exposure of the respective pixels to the incident optical signal.

Example 3. The image sensor according to one of examples 1 or 2, wherein the array is arranged in rows and columns of pixels, and the distribution circuit include a row and/or column decoder configured to selectively access the rows and/or the columns corresponding to the at least two sets of at least one pixel.

Example 4. The image sensor according to one of examples 1 to 3, wherein the array comprises at least one first set of pixels configured to detect components of the visible spectrum of the incident optical signal, the control circuit is configured to respectively generate at least one first timing signal, and the distribution circuit are configured to distribute the at least one first timing signal, respectively in the at least one first set of pixels.

Example 5. The image sensor according to example 4, wherein the array comprises several first sets of pixels, each corresponding to a local region of the array.

Example 6. The image sensor according to one of examples 1 to 5, wherein the array comprises at least one second set of pixels configured to detect an infrared component of the incident optical signal, the control circuit is configured to respectively generate at least one second timing signal, and the distribution circuit are configured to distribute the at least one second timing signal, respectively in the at least one second set of pixels.

Example 7. The image sensor according to one of examples 1 to 6, wherein the array comprises at least one third set of pixels configured to measure information on the ambient luminosity of the incident optical signal, the control circuit are configured to respectively generate at least one third timing signal, and the distribution circuit are configured to distribute the at least one third timing signal in respectively the at least one third set of pixels.

Example 8. The image sensor according to example 7, wherein the third set of pixels includes a homogeneous spatially pseudo-random distribution of isolated pixels on the surface of the array.

Example 9. The image sensor according to one of examples 7 or 8, further including processing circuit dedicated to the third set of pixels and configured to average and filter signals photogenerated by the pixels of the third set during the acquisition, to provide information on the overall ambient luminosity of the incident optical signal.

Example 10. The image sensor according to one of examples 7 to 9, wherein the pixels of the third set of pixels are configured to detect multispectral components of the spectrum of the incident optical signal.

Example 11. A method for capturing an image comprising a generation of at least two different timing signals and adapted to control an acquisition of an incident optical signal by pixels of an array of photosensitive pixels comprising at least two sets of at least one pixel, and a distribution of the at least two different timing signals in the at least two sets of at least one pixel, during the same acquisition of the incident optical signal.

Example 12. The method according to example 11, wherein the timing signals control a time of exposure of the respective pixels of the incident optical signal.

Example 13. The method according to one of examples 11 or 12, wherein the array is arranged in rows and columns of pixels, and the distribution comprising a row and/or column decoding, to selectively access the rows and/or the columns corresponding to the at least two sets of at least one pixel.

Example 14. The method according to one of examples 11 to 13, comprising an acquisition of components of the visible spectrum of the incident optical signal in at least one first set of pixels, controlled by at least one first timing signal respectively distributed in the at least one first set of pixels.

Example 15. The method according to example 14, wherein the acquisition of the components of the visible spectrum of the incident optical signal is done in several first sets of pixels, each corresponding to a local region of the array.

Example 16. The method according to one of examples 11 to 15, comprising an acquisition of an infrared component of the incident optical signal in at least one second set of pixels, controlled by at least one second timing signal respectively distributed in the at least one second set of pixels.

Example 17. The method according to one of examples 11 to 16, comprising a measurement of information on the ambient luminosity of the incident optical signal in at least one third set of pixels, controlled by at least one third timing signal respectively distributed in the at least one third set of pixels.

Example 18. The method according to example 17, wherein the pixels of the third set of pixels are distributed in a homogeneous spatially pseudo-random manner in isolated pixels on the surface of the array.

Example 19. The method according to one of examples 17 or 18, further comprising a processing, comprising an averaging and a filtering of the signals photogenerated by the pixels of the third set during the acquisition to provide information on the overall ambient luminosity of the incident optical signal.

Example 20. The method according to one of examples 17 to 19, wherein the measurement of the information on the ambient luminosity of the incident optical signal comprises an acquisition of multispectral components of the spectrum of the incident optical signal.

Example 21. An image sensor including an array of photosensitive pixels arranged in rows and columns of pixels comprising at least two sets of pixels each corresponding to a region of the array including several adjacent rows, control circuit configured to generate as many different timing signals as there are sets of pixels, the timing signals being adapted to control a time of exposure of an acquisition of an incident optical signal by the pixels of the array, and distribution circuit configured to respectively distribute the timing signals in the sets of pixels, during the same acquisition of the incident optical signal.

Example 22. The image sensor according to example 21, wherein the distribution circuit include a row decoder, is configured to selectively access the rows of the regions of the array corresponding to the at least two sets of pixels.

Example 23. The image sensor according to one of examples 21 or 22, wherein the regions of the array are located over a half-length of the adjacent rows, on either side of a median of the array perpendicular to the direction of the rows.

Example 24. The image sensor according to example 23 considered in combination with example 22, wherein the distribution circuit includes a first row decoder dedicated to a first half of the array on one side of the median, as well as a second row decoder dedicated to a second half of the array on other side of the median.

Example 25. The image sensor according to one of examples 21 or 22, wherein the regions of the array are located over the entire length in the direction of the rows of the adjacent rows.

Example 26. The image sensor according to one of examples 21 to 24, wherein the control and distribution circuit are configured to distribute the timing signals, during the same acquisition of the incident optical signal, so that the times of exposure of the different sets of pixels start at the same time point, or the times of exposure of the different sets of pixels finish at the same time point, or the times of exposure of the different sets of pixels are distributed and included within the duration of the longest time of exposure.

Example 27. The image sensor according to one of examples 21 to 26, wherein the sets of pixels comprise a first set of pixels, a third set of pixels, and, between the first set and the third set, a second set of pixels, including at least two subsets of at least one row of pixels, the control circuit being configured to generate first timing signals adapted to control a first time of exposure for the first set of pixels, third timing signals adapted to control a third time of exposure, longer than the first time of exposure, for the third set of pixels, and second timing signals adapted to control second times of exposure with durations varying monotonously between the first time of exposure and the third time of exposure, respectively from the subset of pixels adjacent to the first set up to the subset of pixels adjacent to the third set.

Example 28. A method for capturing an image comprising a generation of at least two different timing signals and adapted to control a time of exposure of an acquisition of an incident optical signal by pixels of an array of photosensitive pixels, arranged in rows and columns of pixels, comprising as many sets of pixels as there are timing signals, each of the sets of pixels corresponding to a physical region of the array including several adjacent rows, the method comprising a distribution of the timing signals respectively in the sets of pixels, during the same acquisition of the incident optical signal.

Example 29. The method according to example 28, wherein the distribution comprises a row decoding and a sequencing to selectively access the rows of the regions of the array corresponding to the at least two sets of pixels.

Example 30. The method according to one of examples 28 or 29, adapted for regions of the array located over a half-length of the adjacent rows, on either side of a median of the array perpendicular to the direction of the rows.

Example 31. The method according to example 30 considered in combination with example 29, wherein the distribution comprises a first row decoding and a first sequencing dedicated to a first half of the array on one side of the median, as well as a second row decoding and a second sequencing dedicated to a second half of the array on the other side of the median.

Example 32. The method according to one of examples 28 or 29, adapted for regions of the array located over the entire length in the direction of the rows of the adjacent rows.

Example 33. The method according to one of examples 28 to 32, wherein the generation and the distribution are adapted to distribute the timing signals, during the same acquisition of the incident optical signal, so that the times of exposure of the different sets of pixels starting at the same time point, or the times of exposure of the different sets of pixels finishing at the same time point or the times of exposure of the different sets of pixels are distributed and included within the duration of the longest time of exposure.

Example 34. The method according to one of examples 28 to 33, wherein the generation of the timing signals comprises a generation of first timing signals adapted to control a first time of exposure for a first set of pixels, a generation of third timing signals adapted to control a third time of exposure, longer than the first time of exposure for a third set of pixels, and a generation of second timing signals adapted to control second times of exposure for a second set of pixels including at least two subsets of at least one row of pixels between the first set and the third set, the second times of exposure having durations varying monotonously between the first time of exposure and the third time of exposure, respectively from the subset of pixels adjacent to the first set up to a subset of pixels adjacent to the third set.

Example 35. An image sensor according to one of examples 1 to 10 or according to one of examples 21 to 27, including reading circuit configured to provide read signals resulting from an acquisition of an incident optical signal by the pixels of the array, wherein the control circuit include a video timing circuit configured to assess the dynamics of the image from a distribution of the amplitudes of the read signals, and to control a next acquisition of an incident optical signal with the timing signals and a distribution of the timing signals in a frame mode if the dynamics are lower than first threshold, in a band mode if the dynamics are comprised between the first threshold and a second threshold, and in a pixel mode if the dynamics are higher than the second threshold.

Example 36. The image sensor according to example 35, wherein, in the frame mode, the control and distribution circuit are configured to generate timing signals adapted to control a unique time of exposure and distribution of these timing signals to all pixels of the array.

Example 37. The image sensor according to example 35 or 36 considered in combination with one of examples 21 to 27, wherein, in the band mode, the control and distribution circuit are configured to generate the as many different timing signals as there are sets of pixels, and to distribute these timing signals in the sets of pixels each corresponding to a region of the array including several adjacent rows.

Example 38. The image sensor according to one of examples 35 to 37 considered in combination with one of examples 1 to 10, wherein, in the pixel mode, the control and distribution circuit are configured to generate the respective timing signals to each set of at least one pixel, and to distribute these timing signals in the sets of at least one respective pixel.

Example 39. The image sensor according to one of examples 35 to 38, wherein the video timing circuit is configured, in each of the modes, to set the times of exposure controlled by the timing signals of a subsequent acquisition according to the read signals resulting from a prior acquisition, respectively in each of the different sets of pixels.

Example 40. A method for capturing an image according to one of examples 11 to 20 or according to one of examples 28 to 34, comprising: a reading providing read signals resulting from an acquisition of an incident optical signal by the pixels of the array, an analysis of the dynamics of the image from a distribution of the amplitudes of the read signals, and a control of a next acquisition of an incident optical signal with the timing signals and a distribution of the timing signals in a frame mode if the dynamics are lower than a first threshold, in a band mode if the dynamics are comprised between the first threshold and a second threshold, and in a pixel mode if the dynamics are higher than the second threshold.

Example 41. The method according to example 40, wherein, in the frame mode, the generation and the distribution of the timing signals are adapted to control a unique time of exposure in all pixels of the array.

Example 42. The method according to one of examples 40 or 41 considered in combination with one of examples 28 to 34, wherein, in the band mode, the generation and the distribution of the timing signals are adapted to control respective times of exposure to each of the sets of pixels each corresponding to a region of the array including several adjacent rows.

Example 43. The method according to one of examples 40 to 42 considered in combination with one of examples 11 to 20, wherein, in the pixel mode, the generation and distribution of the timing signals are adapted to control respective times of exposure to each of the sets of pixels each corresponding to a region of the array including several adjacent rows.

Example 44. The method according to one of examples 40 to 43, wherein, in each of the modes, the times of exposure controlled by the timing signals of a subsequent acquisition are set according to the read signals resulting from a prior acquisition, respectively in each of the different sets of pixels.

Example 45. An image sensor including an array of photosensitive pixels dedicated to components of the spectrum of the light, each pixel including a photosensitive semiconductor region, a transfer gate coupled between the photosensitive region and a transfer node, the transfer node having a capacitive value defining a charge-to-voltage conversion factor of each pixel, wherein the array of pixels is arranged according to a periodic pattern of macro-pixels each dedicated to one component, and each including at least one first pixel and at least one second pixel dedicated to this component, the capacitive value of the transfer node of the first pixel defining a first charge-to-voltage conversion factor, the capacitive value of the transfer node of the second pixel defining a second charge-to-voltage conversion factor different from the first charge-to-voltage conversion factor.

Example 46. The image sensor according to example 45, wherein the periodic pattern of macro-pixels includes at least two macro-pixels dedicated to respective components, the first pixels and second pixels of the at least two macro-pixels being positioned to be contiguous only to the first or second pixels of another macro-pixel of the same pattern.

Example 47. The image sensor according to example 46, wherein each macro-pixel includes two first pixels and two second pixels, and wherein the periodic pattern of macro-pixels includes four macro-pixels dedicated, respectively, to four components.

Example 48. The image sensor according to one of examples 45 to 47, including the control circuit configured to generate a first timing signal and a second timing signal, is different and adapted to respectively control a first time of exposure and a second time of exposure of an acquisition of an incident optical signal by the pixels of the array and distribution circuit configured to distribute the first timing signal in the first pixels of the macro-pixels of the array, and to distribute the second timing signal in the second pixels of the macro-pixels of the array, during the same acquisition of the incident optical signal.

Example 49. The image sensor according to example 48, wherein the first charge-to-voltage conversion factor is greater than the second charge-to-voltage conversion factor and the first time of exposure is longer than the second time of exposure.

Example 50. A method for capturing an image with an image sensor according to example 45, comprising a generation of a first timing signal and a second timing signal, different and adapted to respectively control a first time of exposure and a second time of exposure of an acquisition of an incident optical signal by the pixels of the array, and distribution of the first timing signal in the first pixels of the macro-pixels of the array, and of the second timing signal in the second pixels of the macro-pixels of the array, during the same acquisition of the incident optical signal.

Example 51. The method according to example 50, wherein the first charge-to-voltage conversion factor is greater than the second charge-to-voltage conversion factor, and the first time of exposure is longer than the second time of exposure.

Example 52. The method according to one of examples 50 or 51, wherein the capture method comprises: a reading providing first read data resulting from the same acquisition of the incident optical signal by the first pixels of the array, and second read data resulting from the same acquisition of the incident optical signal by the second pixels of the array, a reconstruction of a high dynamic range (HDR) image, comprising an application of a respective normalisation gain to each read data, the respective normalisation gains being adapted to compensate for the difference between the respective times of exposure of the pixels of the array.

Example 53. The method according to example 52, wherein the reconstruction of the HDR image further comprises, before the application of the normalisation gain: an identification, for each read data, of an exposure limit condition amongst an overexposure condition, an underexposure condition, or a near-limit condition; and if the read data is identified in one of the exposure limit conditions, a determination of a substitution data, replacing the read data, from the read data resulting from an acquisition with neighboring pixels of the array dedicated to the same component.

Example 54. The method according to example 53 considered in combination with example 51, wherein the overexposure condition is identified if the read data results from an acquisition with the first time of exposure, and if the read data has a value greater than a second threshold, the corresponding substitution data being determined from the read data resulting from an acquisition with the second time of exposure of the neighboring pixels of the array.

Example 55. The method according to one of examples 53 or 54 considered in combination with example 51, wherein the underexposure condition is identified if the read data results from an acquisition with the second time of exposure, and if the read data has a value lower than a first threshold, the corresponding substitution data being determined from the read data resulting from an acquisition with the first time of exposure of the neighboring pixels of the array.

Example 56. The method according to one of examples 53 to 55 considered in combination with example 51, wherein the near-limit condition is identified if the read data has a value comprised between the first threshold and the second threshold, the corresponding substitution data being determined from the read data resulting from an acquisition with the first time of exposure of the neighboring pixels of the array and from the read data resulting from an acquisition with the second time of exposure of the neighboring pixels of the array.

Example 57. The method according to one of examples 53 to 56, wherein the determination of the substitution data comprises a filtering calculating a weighted average value of the read data resulting from an acquisition with the neighboring pixels of the array, the weights being assigned to the read data according to an orientation of the spatial variations in the HDR image.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the examples encompass any such modifications or embodiments.

What is claimed is:

1. A control circuit, configured to:
generate a first timing signal to control a first exposure time to acquire an incident optical signal by first pixels of an array of photosensitive pixels, the array of photosensitive pixels arranged in a periodic pattern of macro-pixels, each macro-pixel dedicated to one component and including a first pixel and a second pixel dedicated to this component, a capacitive value of a transfer node of the first pixel defining a first charge-to-voltage conversion factor, a capacitive value of a transfer node of the second pixel defining a second charge-to-voltage conversion factor different from the first charge-to-voltage conversion factor; and
generate a second timing signal to control a second exposure time to acquire the incident optical signal by second pixels of the array.

2. The control circuit of claim 1, wherein the array of photosensitive pixels is dedicated to components of a spectrum of light, wherein each pixel includes a photosensitive semiconductor region, a transfer gate coupled between the photosensitive semiconductor region, and a transfer node with a capacitive value defining a charge-to-voltage conversion factor of each pixel.

3. The control circuit of claim 1, wherein the first timing signal is distributed in the first pixels, wherein the second timing signal is distributed in the second pixels, and wherein the first timing signal and the second timing signal are distributed during the same acquisition of the incident optical signal.

4. The control circuit of claim 1, wherein the periodic pattern of macro-pixels includes two macro-pixels dedicated to respective components, the first pixels and second pixels of the two macro-pixels being positioned to be contiguous only to the first pixels or the second pixels of another macro-pixel of the same pattern.

5. The control circuit of claim 4, wherein each macro-pixel includes two first pixels and two second pixels, and wherein the periodic pattern of macro-pixels includes four macro-pixels dedicated, respectively, to four components.

6. The control circuit of claim 5, wherein the first charge-to-voltage conversion factor is greater than the second charge-to-voltage conversion factor, and wherein the first exposure time is longer than the second exposure time.

7. The control circuit of claim 1, further configured to generate a third timing signal to measure ambient luminosity by third pixels of the array.

8. A sensor, comprising:
an array of photosensitive pixels arranged in a periodic pattern of macro-pixels, each macro-pixel dedicated to one component and including a first pixel and a second pixel dedicated to this component, a capacitive value of a transfer node of the first pixel defining a first charge-to-voltage conversion factor, a capacitive value of a transfer node of the second pixel defining a second charge-to-voltage conversion factor different from the first charge-to-voltage conversion factor; and
a control circuit, configured to:
generate a first timing signal to control a first exposure time to acquire an incident optical signal by the first pixels of the array of photosensitive pixels, and
generate a second timing signal to control a second exposure time to acquire the incident optical signal by the second pixels of the array.

9. The sensor of claim 8, wherein the array of photosensitive pixels is dedicated to components of a spectrum of light, wherein each pixel includes a photosensitive semiconductor region, a transfer gate coupled between the photosensitive semiconductor region, and a transfer node with a capacitive value defining a charge-to-voltage conversion factor of each pixel.

10. The sensor of claim 8, further comprising a distribution circuit configured to:
distribute the first timing signal to the first pixels; and
distribute the second timing signal to the second pixels, wherein the first timing signal and the second timing signal are distributed during the same acquisition of the incident optical signal.

11. The sensor of claim 8, wherein the periodic pattern of macro-pixels includes two macro-pixels dedicated to respective components, the first pixels and second pixels of the two macro-pixels being positioned to be contiguous only to the first pixels or the second pixels of another macro-pixel of the same pattern.

12. The sensor of claim 11, wherein each macro-pixel includes two first pixels and two second pixels, and wherein the periodic pattern of macro-pixels includes four macro-pixels dedicated, respectively, to four components.

13. The sensor of claim 12, wherein the first charge-to-voltage conversion factor is greater than the second charge-to-voltage conversion factor, and wherein the first exposure time is longer than the second exposure time.

14. The sensor of claim 8, wherein each macro-pixel includes a third pixel, and wherein the control circuit is further configured to generate a third timing signal to measure ambient luminosity by the third pixels of the array.

15. A method, comprising:
generating a first timing signal to control a first exposure time to acquire an incident optical signal by first pixels of an array of photosensitive pixels, the array of photosensitive pixels arranged in a periodic pattern of macro-pixels, each macro-pixel dedicated to one component and including a first pixel and a second pixel dedicated to this component, a capacitive value of a transfer node of the first pixel defining a first charge-to-voltage conversion factor, a capacitive value of a transfer node of the second pixel defining a second charge-to-voltage conversion factor different from the first charge-to-voltage conversion factor; and
generating a second timing signal to control a second exposure time to acquire the incident optical signal by second pixels of the array.

16. The method of claim 15, wherein the array of photosensitive pixels is dedicated to components of a spectrum of light, wherein each pixel includes a photosensitive semiconductor region, a transfer gate coupled between the photosensitive semiconductor region, and a transfer node with a capacitive value defining a charge-to-voltage conversion factor of each pixel.

17. The method of claim 15, wherein the first timing signal is distributed in the first pixels, wherein the second timing signal is distributed in the second pixels, and wherein the first timing signal and the second timing signal are distributed during the same acquisition of the incident optical signal.

18. The method of claim 15, wherein the periodic pattern of macro-pixels includes two macro-pixels dedicated to respective components, the first pixels and second pixels of the two macro-pixels being positioned to be contiguous only to the first pixels or the second pixels of another macro-pixel of the same pattern.

19. The method of claim 18, wherein each macro-pixel includes two first pixels and two second pixels, wherein the periodic pattern of macro-pixels includes four macro-pixels dedicated, respectively, to four components, wherein the first charge-to-voltage conversion factor is greater than the second charge-to-voltage conversion factor, and wherein the first exposure time is longer than the second exposure time.

20. The method of claim 15, further comprising generating a third timing signal to measure ambient luminosity by third pixels of the array.

* * * * *